United States Patent [19]
Jakul et al.

[11] Patent Number: 6,097,475
[45] Date of Patent: Aug. 1, 2000

[54] METHOD AND APPARATUS FOR ORIENTING A RECORDING MEDIA SHEET ON A SUPPORT SURFACE

[75] Inventors: John Jakul, Malden; Akim Lennhoff, Cambridge; Philip A. Rombult, Bradford, all of Mass.

[73] Assignee: Agfa Corporation, Wilmington, Mass.

[21] Appl. No.: 08/915,844

[22] Filed: Aug. 21, 1997

[51] Int. Cl.[7] .............................. G03B 27/58; G03B 27/62
[52] U.S. Cl. ................................. 355/72; 355/47; 355/73
[58] Field of Search .................................. 355/27, 47, 72, 355/73, 104, 106, 117; 346/103, 138; 271/276

[56] References Cited

U.S. PATENT DOCUMENTS

| | | | |
|---|---|---|---|
| 4,739,361 | 4/1988 | Roy et al. | 355/73 X |
| 4,945,238 | 7/1990 | Muraishi | 271/276 X |
| 5,345,870 | 9/1994 | Bailey et al. | 355/72 X |
| 5,852,464 | 12/1998 | Hebert et al. | 346/138 X |

FOREIGN PATENT DOCUMENTS

| | | |
|---|---|---|
| 0551772A | 12/1992 | European Pat. Off. . |
| 2281633A | 8/1994 | United Kingdom . |

*Primary Examiner*—Fred L Braun
*Attorney, Agent, or Firm*—Erik Ence; Edward L. Kelley

[57] ABSTRACT

A method and apparatus are provided for orienting a sheet of recording media on a support surface for recording an image onto the recording media in a predetermined location. A registration device, which includes two contacting points for contacting an edge of the media, establishes a registration axis having a know orientation and location with respect to the support surface and with respect to the image to be recorded. A media loading device advances the media across the support surface and orients an edge of the media against the two contacting points of the registration device. At least one of the two contacting points of the registration device is movable with respect to the support surface for adjusting the separation between the two contacting points in accordance with a width of the recording media. The image may also be located at a known location with respect to another perpendicular edge of the recording media.

44 Claims, 21 Drawing Sheets

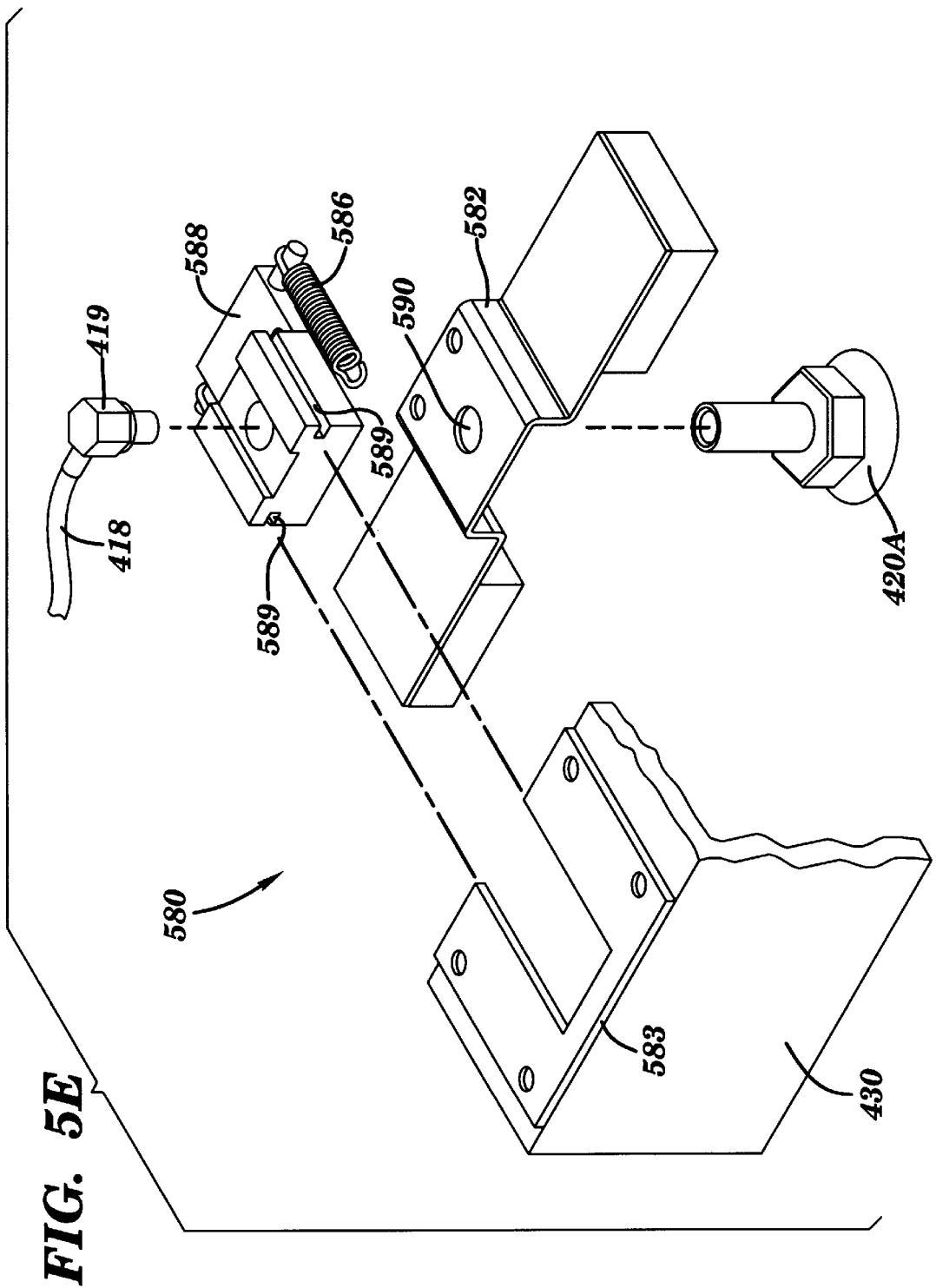

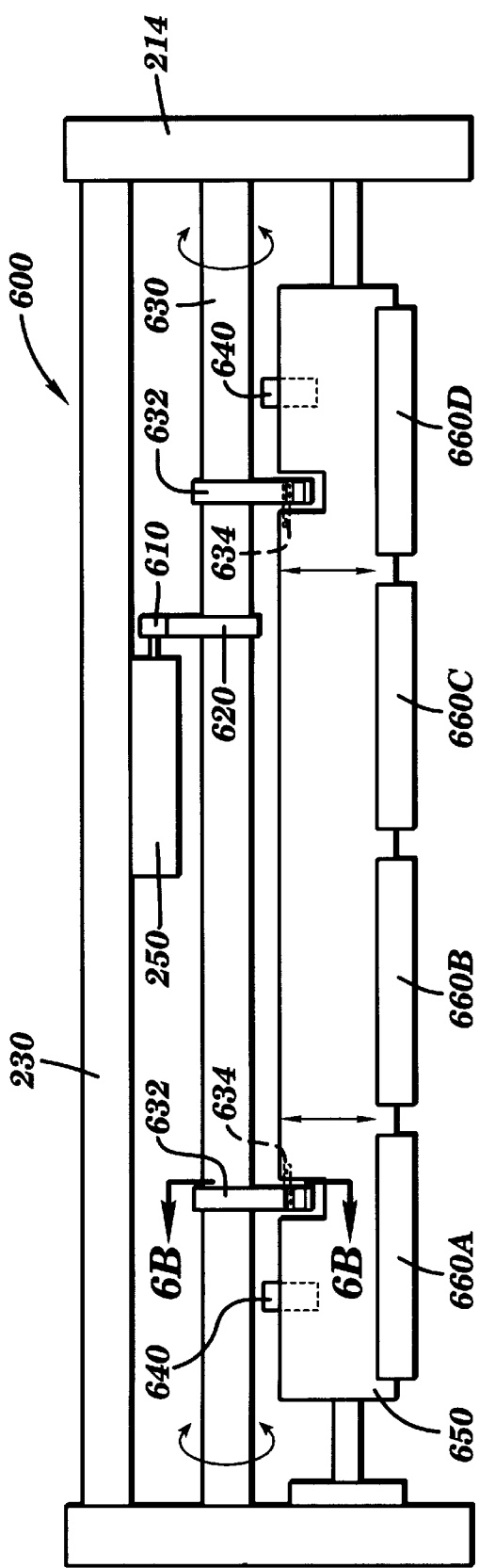
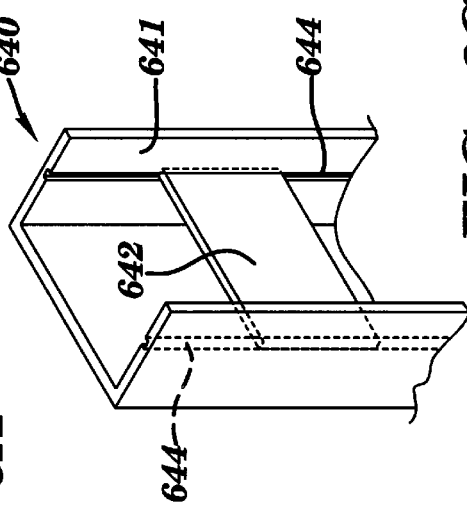
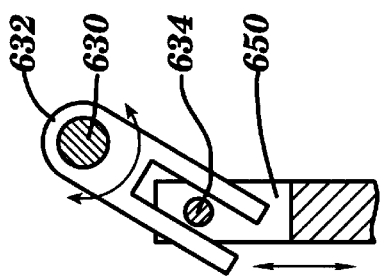

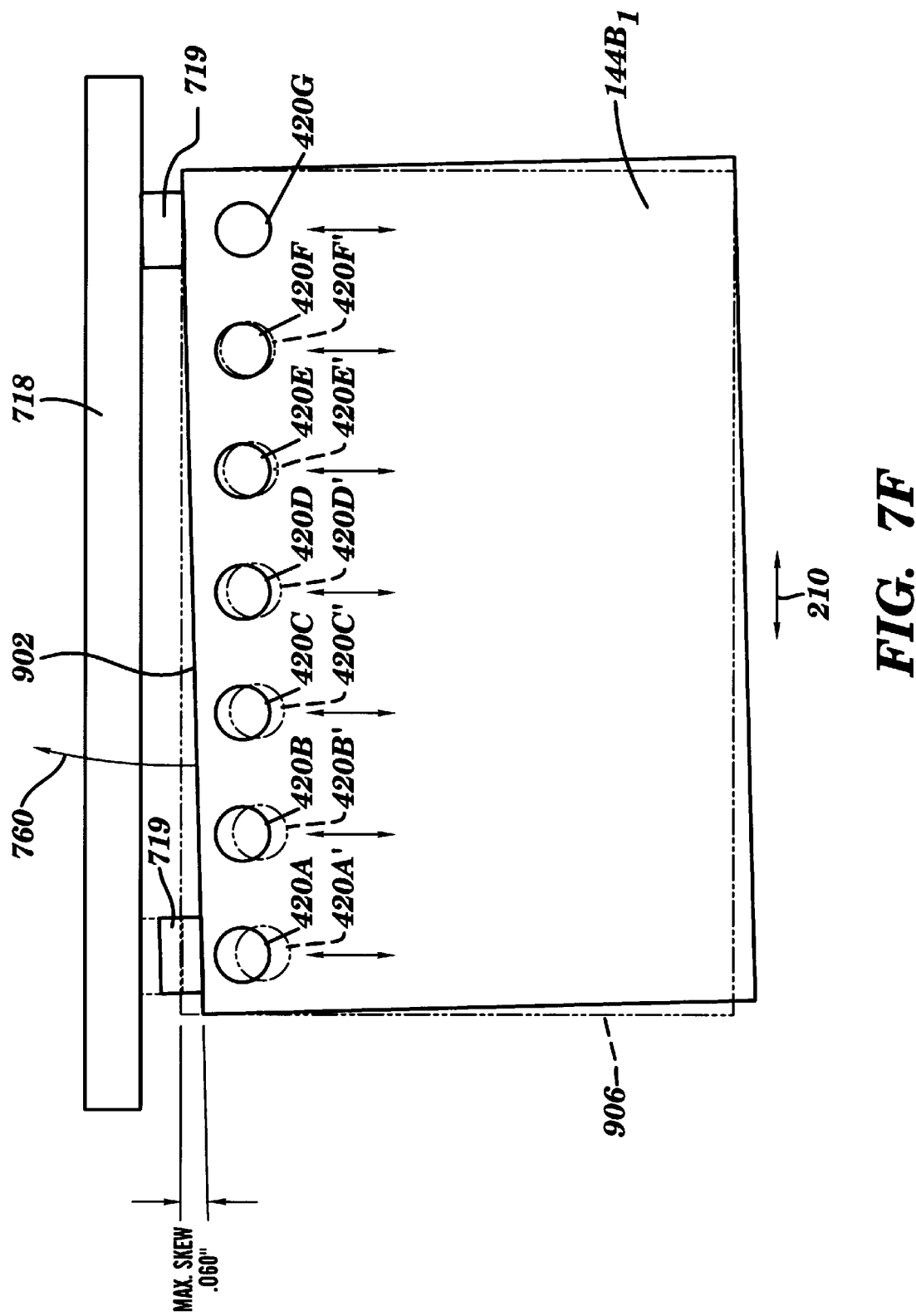

METHOD AND APPARATUS FOR ORIENTING A RECORDING MEDIA SHEET ON A SUPPORT SURFACE

RELATED APPLICATIONS

The present application is related to U.S. application Ser. Nos. 08/868,526 entitled "METHOD AND APPARATUS FOR HOLDING RECORDING MEDIA ONTO A MEDIA SUPPORT SURFACE"; 08/868,970 entitled "IMAGING SYSTEM WITH HIGH EFFICIENCY MEDIA LOADING"; and 08/868,969 entitled "REGISTRATION DETECTION APPARATUS FOR IMAGING SYSTEMS" all filed on Jun. 4, 1997.

TECHNICAL FIELD

The present invention relates to imaging systems such as platesetters and imagesetters and more particularly to imaging systems having automatic loading and unloading of media.

BACKGROUND ART

Modern imagesetters and platesetters utilize optical scanners to write or record images for subsequent reproduction or to read a prerecorded image at a pre-defined resolution rate. Such scanners may write or record images on or read prerecorded images from various media including photo or thermal sensitive paper or polymer films, photo or thermal sensitive coatings or erasable imaging materials, an aluminum or other base printing plate, or other type of media. The media is typically mounted on an imaging support surface which may be planar or curved and then scanned with an optical beam. The primary components of modern imagesetting and platesetting systems include an image processor, which may be in the form of a personal computer or workstation, to generate and/or edit an image, a raster image processor (RIP) for converting data signals from the image processor into signals which can be understood by an engine or system controller which controls the scanning of the optical beam on the media. The imagesetter or platesetter itself typically includes a writing engine having a scan assembly. The scan assembly may, for example, be disposed and moveable within a drum cylinder in which the recording or recorded media is mounted. The writing engine controller, in accordance with the signals from the RIP and its own programmed instructions, generates signals to control the optical scanning so as to write images on or read images from the media mounted within the drum cylinder by scanning one or more optical beams over the recording media mounted against the inside circumference of the drum cylinder while the cylinder itself remains fixed. A typical scan assembly of a cylindrical drum type imager system may include a spin mirror or other optical device to direct the light beam over the inside circumference of the drum cylinder, as will be well understood by one skilled in the art. Modern imaging systems also typically include a loading device, often referred to as an applicator, for loading media onto and removing media from the media support surface of, for example, the drum cylinder.

Imaging systems may also include other components. Typically, imaging systems include a media storage device for storing the unrecorded media (usually only one size media) to be imaged by the imager, e.g., the imagesetter or platesetter. As described above, the imager records a latent image onto the media, thereby providing a developed or final image. The system often additionally includes a media processor which develops or otherwise processes the final image. If these components are included in the system, the imaging system may also include devices, which may for example be electro-mechanical assemblies, to deliver the media from the storage device to the imager loading device and from the imager to the media processor. To provide efficient operation, conventional imaging systems load media onto, for example, the internal surface of a cylindrical drum from one side of the drum and remove the imaged media from the other side of the drum. This results in the media having a short travel distance between the media storage device and entry into the cylindrical drum of the imager. To keep this distance as short as possible, designers attempt to locate the media storage device as close as possible to the imager. Accordingly, in operation, the system's media delivery device moves a sheet of media from the storage device to an applicator which inserts the media, leading edge first, onto the support surface of the cylindrical drum from the side of the cylindrical drum closest to the storage device. The applicator moves the media into the desired position on the internal surface of the cylindrical drum prior to imaging by the scan assembly. In order to provide quality imaging, it is imperative that the media to be imaged be properly positioned on the support surface of the imaging system. This is because multiple color separations of the same image are used to record a final image. Therefore, each latent image representing a color must be properly registered with respect to the imaging beam path. Typically prior art registration configurations use a registration device, for example, two registrations pins, to align the leading edge of the media to a registration axis of the imaging system. Preferably, the registration pins should be as far as part as possible while contacting the leading edge to provide a more accurate alignment of the leading edge with respect to the registration axis. However, the registration pins in conventional systems are typically fixed, or moveable with a substantial amount of work required by the operator. Thus, if a job requires different plate sizes, the operator must either set the registration pins sufficiently far apart to properly register the smallest plate size (which results in less than ideal separation of the registration pins for larger plate sizes) or manually change the position of the registration pins which results in lost productivity.

Once the imaging is completed, the applicator removes the imaged media from the internal surface of the cylindrical drum, leading edge first, and out of the far side of the drum to an media delivery device. The media delivery device then continues the movement of the imaged media, leading edge first, to the media processor. The media processor is also typically designed to be located as close as possible to the far side of the cylindrical drum to reduce the distance over which the imaged media travels. The media is then moved into the media processor where development of the imaged media occurs.

In the typical operational sequence of conventional imaging systems, the media delivery device remains in a parked position during the positioning of the media on and removal of the imaged media from the cylindrical drum, as well as during the imaging of the media. Only after the imaged media has been removed from the internal surface of the cylindrical drum, and often only after the imaged media has been removed entirely from the cylindrical drum, does the media delivery device remove another sheet of media from the storage device and deliver it to the loading device. Typically, the imaged media is not removed from the internal surface of the cylindrical drum until the imaged processor has been emptied. More particularly, if another sheet of imaged media is being developed in the media processor, after imaging a sheet of media in the cylindrical drum, the imaged media in the cylindrical drum is not removed from the cylindrical drum until the imaged media being developed in the plate processor is removed from the processor.

Because the movement of the media from the storage device to the media processor in conventional systems proceeds in a single direction, i.e., a single edge of each respective sheet of media leads the movement of the sheet throughout the process, and the single media is loaded into the cylindrical drum from the side of the cylindrical drum closes to the storage device and removed from the side of the cylindrical drum closest to the media processor, the imaged media must be stored emulsion side up. Hence, although it is beneficial to store media with the emulsion side down for numerous reasons which are well known in the art, in conventional systems the media is consistently stored emulsion side up due to the travel path of the media.

OBJECTIVES OF THE INVENTION

According, it is an object of the present invention to provide an imaging system which loads and unloads media with enhanced efficiency.

It is another object of the present invention to provide an imaging system which facilitates the loading and unloading of different size media onto a media support surface.

It is another object of the present invention to provide an imaging system capable of properly positioning media of differing widths on the media support surface prior to imaging.

It is a further object of the present invention to provide an imaging system which ensures proper alignment registration of the media to be imaged with respect to the imaging elements as it is loaded onto the media support surface.

It is another object of the present invention to provide an imaging system which will square or deskew the media to be imaged as it is loaded onto the media support surface.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention provides an imaging system for automatically recording a sheet of media. The imaging system comprises a sheet of media having a leading edge to be imaged at an imaging position. A support surface supports the sheet of media at the imaging position during imaging. A registration device includes a registration axis configured to be contacted by the leading edge when the sheet of media is at the imaging position. A loading device advances the leading edge of the sheet of media across the support surface substantially perpendicular to the direction of movement of the sheet of media until the leading edge is registered against the registration device. An imaging device exposes an image onto the sheet of media at a predetermined distance and orientation relative to the registration axis.

A method is provided for imaging a sheet of media which comprises the steps of advancing a sheet of media with a loading device, a leading edge of the sheet of media advancing substantially perpendicular to the direction of movement of the sheet of media, across a support surface to an imaging position. The leading edge is driven against a registration device, which has a registration axis, until the sheet of media is in contact with the registration device. An imaging device exposes an image onto the sheet of media at a predetermined distance and orientation relative to the registration axis.

A method is further provided for making a printing plate which includes the steps of selecting a plate size in accordance with the size of an image to be recorded. At least one of two registration points of an imaging is device is moved along an axis parallel with a registration axis of an imaging device such that the first and second registration points are separated by a predetermined distance according to plate size. A leading edge of the plate to be image is advanced across a support surface to contact the first and second registration points. A latent image is then recorded onto the printing plate with an imaging device at a predetermined distance and orientation relative to the registration axis. The printing plate is then processed and loaded into a punching/notching device which includes a first and a second registration points separated by the same distance as the first and second registration points in the imaging device. The leading edge of the printing plate is registered to the first and second registration points of the punching/notching device and the printing plate is punched or notched in preparation for mounting in a printing press.

BRIEF DESCRIPTION OF DRAWINGS

FIG. 5E depicts an isometric, exploded view of an individual suction cup assembly, in accordance with the present invention.

FIGS. 6A–6C detail the roller module, in accordance with the present invention.

FIG. 7F depicts the media deskewing movement after contacting the first registration pin, in accordance with the present invention.

BEST MODE FOR PRACTICING THE INVENTION

Figure 1:
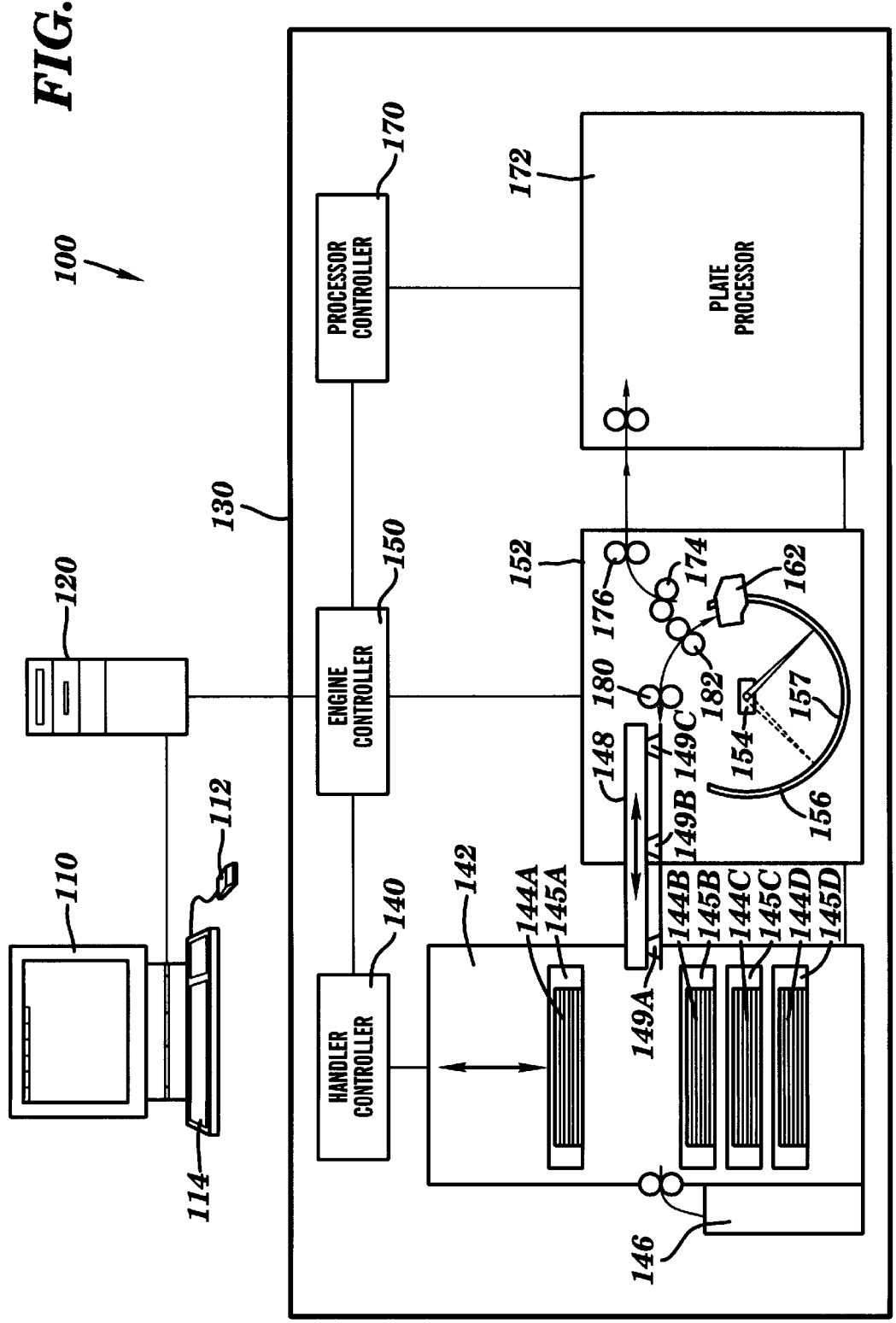
FIG. 1 depicts an imaging system in accordance with the present invention.

FIG. 1 depicts an imaging system 100 in accordance with the present invention. As shown, the imaging system 100 is comprised of a computer 110, a raster image processor (RIP) 120 and a platemaker or platesetter 130. The computer 110, which may be virtually any type of a computing device, allows images to be created or edited and serves as a general operator input device to the depicted imaging system. For example, the computer 110 can be utilized to select a particular scanning resolution and particular size media to be used during a particular operational sequence.

The platesetter 130 has three major components. An on-line stacked plate storage device or plate handler 142, an imaging engine or imagesetter 152, and an optional on-line plate processor/stacker 172.

The plate handler 142, which is controlled by a handler controller 140, stores media 144A–144D of various sizes, or stacks of various sizes, in respective cassettes 145A–145D. The plate handler 142 may also include a slip sheet removal mechanism 146 which is preferably of the type in U.S. patent application Ser. No. 08/693,740 filed on Aug. 7, 1996, the disclosure of which is incorporated herein by reference. The slip sheet removal mechanism 146 is used to remove a slip sheet (not shown), if any, located between the individual sheets of media stored in the cassette. The slip sheet is placed between each sheet of media to protect the surface of the media from being scratched. As indicated, the cassettes 145A–145D are movable vertically to position a desired cassette below the media delivery device or plate picker 148, to provide plate picker 148 with access to media of the selected size. The plate picker 148 then conveys the individual sheets of media to a loading device or applicator 162 for loading onto the internal support surface 157 of a cylindrical drum 156.

The system operator can identify or select a desired plate size using the computer keyboard 114 or mouse 112, for example, to select one of multiple plate sizes displayed on a monitor of the computer 110 or to input a desired plate size or a cassette number representing the cassette in which plates of the desired size are stored. Selection of the plate size according to the image size may also be an automated feature of the computer 110, RIP 120, or imaging system 100. The identification or selection of the desired plate size on the computer 110 results in generation and transmission of a signal by the computer 110 to the RIP 120 which is transformed into an appropriate signal to the handler controller 140. In accordance with this signal, the controller 140 controls the handler 142 in the manner previously described such that the desired plate size plates can be accessed and conveyed by the plate picker 142 to the applicator 162 of the imaging engine 152.

The plate picker 148, removes a sheet of media from the applicable cassette, i.e., cassette 145B as shown, by lifting the media with rows of suction cups 149A–149C. The picker 148 then conveys the removed media, via a pair of rollers which form nips 180 and 182, to the applicator 162 of the imaging engine 152.

Images are transmitted from the computer 110 to the RIP 120 which converts the digitized signals received from the computer 110 into signals which can be understood by the engine controller 150 to control the imaging engine 152. The plate picker 148 which operates in conjunction with the plate handler 142 and the applicator 162 to convey individual sheets of media, i.e., individual plates as shown, from the plate handler 142 onto a support or mounting surface 157 of the cylindrical drum 156. Once properly positioned by the applicator 162 on the mounting surface 157, the media is scanning by a scanning light beam radiating from a moving scan assembly 154 in accordance with instructions from the engine controller 150 responsive to signals received from the RIP 120.

When the imager has recorded an image on the imaged sheet of media, the sheet of media is then transferred by the applicator 162 to the plate processor 172 via a second pair of rollers, which form nips 174 and 176. The plate processor 172 is controlled by the processor controller 170 in accordance with signals received from the RIP 120 to chemically, mechanically, or otherwise process the imaged media. The plate processor 172 is shown to be a chemical processor using silver based recording media, however the type of media processor will of course be determined by the type of media being imaged (e.g., thermal). The processed media is then removed from the system 100.

Figure 2:
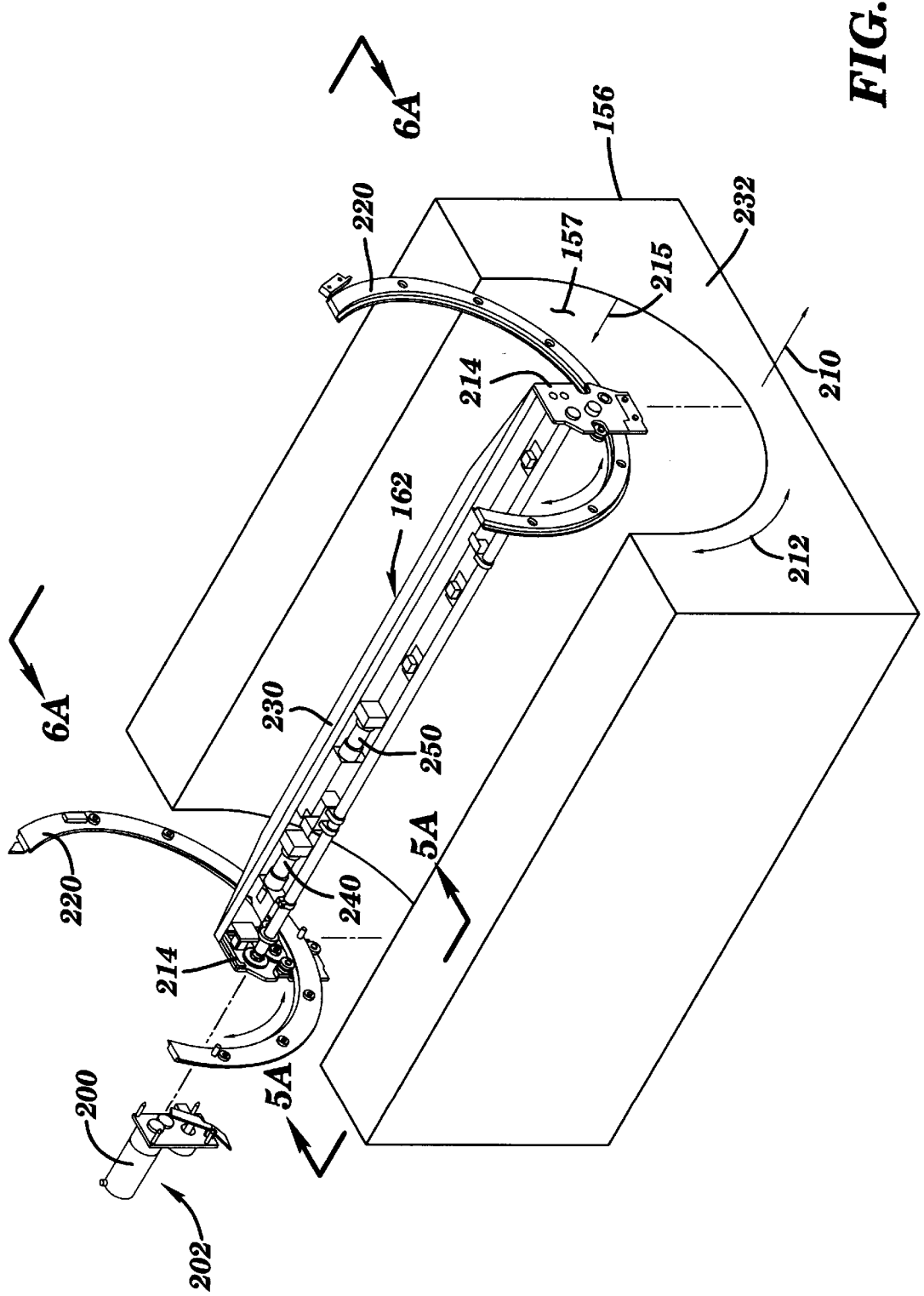
FIG. 2 depicts an isometric exploded view particularly featuring the applicator shown in FIG. 1, in accordance with the present invention.

FIG. 2 depicts the applicator 162 which is disposed within the drum 156. For orientation and reference purposes, the drum 156 defines three directions: an axial or longitudinal and circumferential direction, indicated by directional arrows 210 and 212 respectively, and a radial direction, defined by any line 215 which is perpendicular to the mounting surface 157. A rail or track 220 is provided on each end of the drum 156 to guide the applicator 162 movement along the circumferential direction 212 of the drum during positioning media on and removing media from the mounting surface 157 of the cylindrical drum 156. In the preferred embodiment of the present invention, the rail 220 is provided on the outside surface 232 on each end of the drum 156.

The applicator 162 comprises three main components. A self-propelling drive system 202 for propelling the applicator 162 along the tracks 220, a cup module for holding the media to the applicator (shown in FIGS. 5A–5E), and a roller module (shown in FIGS. 6A–6C) for ironing down the media to the mounting surface 157 to ensure the media is pressed firmly to the mounting surface. The applicator 162 includes a carriage 230 positioned along the axial direction 210 of the drum 156 and a pair of endplates 214 which supports the carriage.

Figure 3:
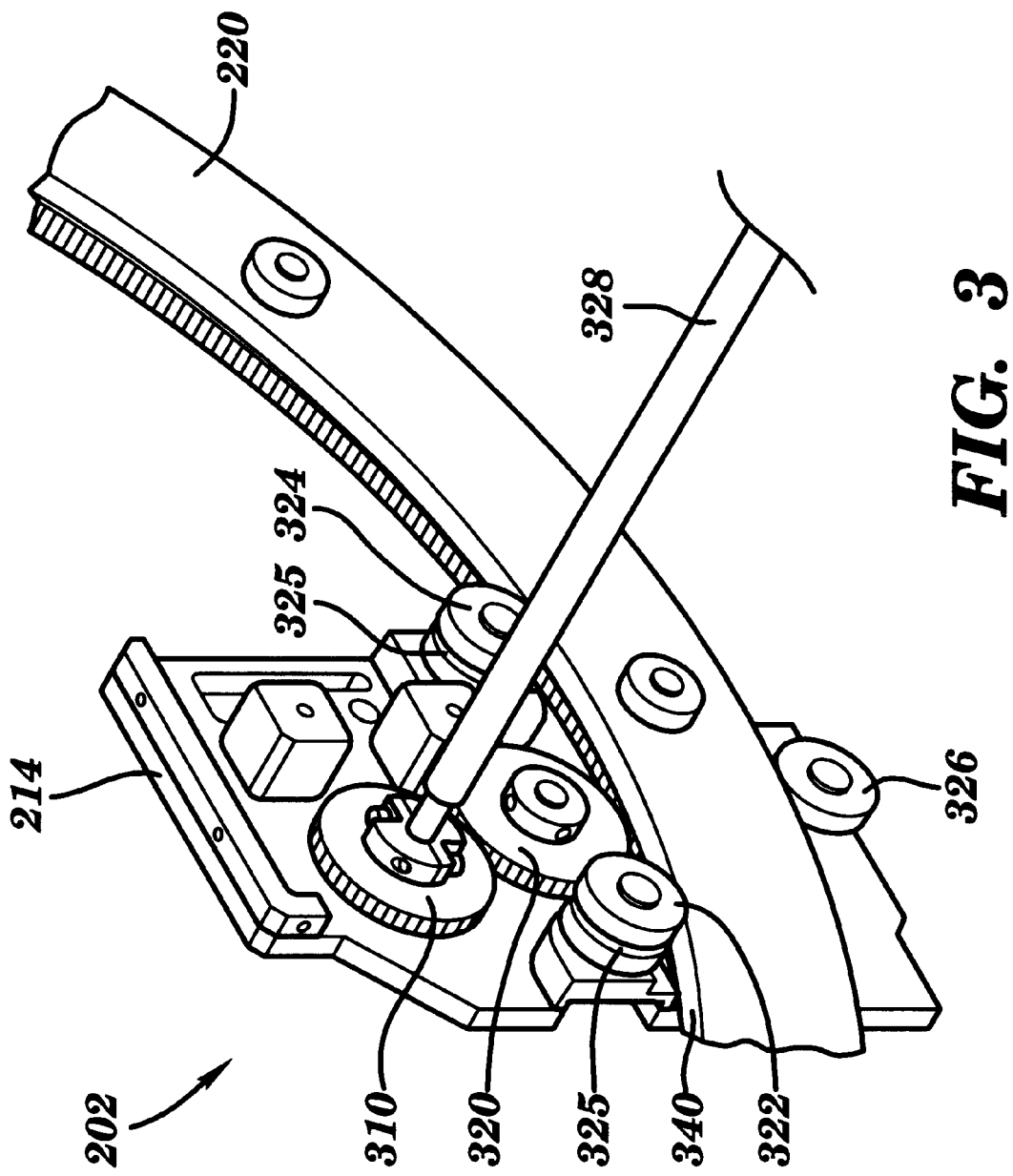
FIG. 3 further details the drive assembly for the applicator shown in FIG. 2, in accordance with the present invention.

FIGS. 2 and 3 show the self-propelling drive system 202. A drive motor 200 is supported by endplate 214. The drive motor 202 rotates a longitudinal shaft 328 which is connected to a drive gear 310 at each end thereof. Each drive gear 310 is engaged with an idler gear 320 which is engaged with the track 220. Each endplate 214 is mounted to the track 220 by three bearings 322, 324, and 326. Bearings 322 and 324 have V-grooved outer races 325 which cooperate with a bearing rail 340 to accurately maintain the axial 210 and circumferential 212 position of the applicator with respect to the drum 156. Bearing 326 is located on the opposite side of track 220 and is spring-loaded in the radial direction 215 toward the center of the drum 156 to thereby hold and clamp each endplate 214 to track 220. A brake device (not shown) may be included in drive system 202 to hold the applicator 162 in position in the circumferential direction 212 of the drum 156, for example, if drive motor 200 loses power. Additionally, the brake device may be used to hold the applicator 162 in place for extended periods of time thereby reducing strain on drive motor 200.

Figure 4:
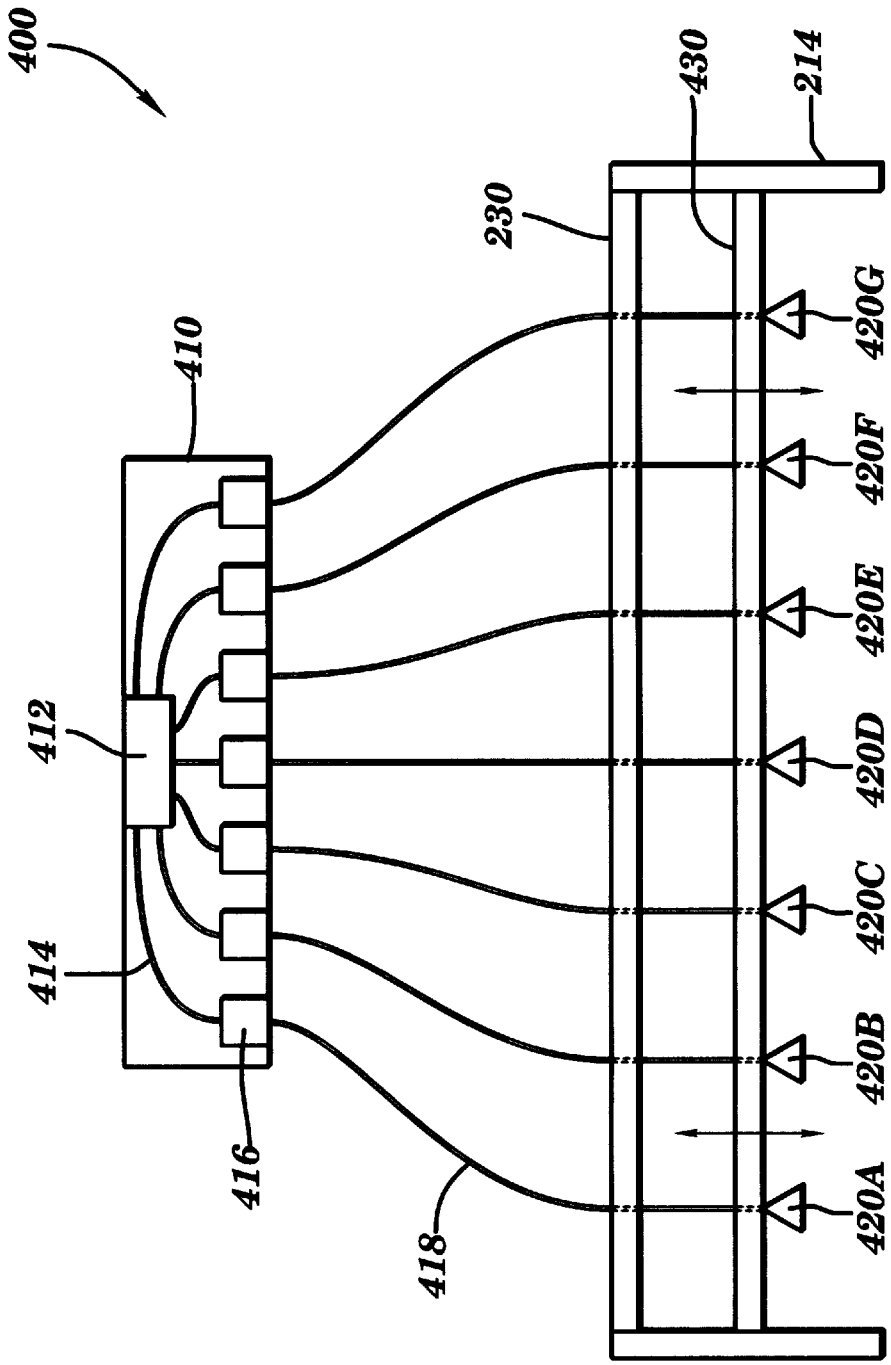
FIG. 4 depicts a schematic view of the cup module of the applicator shown in FIGS. 1 and 2, in accordance with the present invention.

FIG. 4 is a schematic illustration of the cup module, generally indicated by reference number 400. Suction cups 420A–420G are affixed to a support member or platen 430 which is slidably mounted to endplates 214 so that the suction cups may travel in the radial direction 215 of the drum 156. Each suction cup is connected via flexible hoses 418 to a manifold box 410, which in the preferred embodiment of the invention is located in the imaging engine 152 but not on the applicator itself 162. The manifold box 410 houses sequencing devices or servos 416 which are connected via hoses 414 to a device for drawing air 412, e.g., a vacuum pump, which may be located in the manifold box, and to an individual suction cup 420A–420G. The device for drawing air 412 and servos 416 are controlled by engine controller 150. In operation, the engine controller receives the media information required for the job and directs the appropriate number of servos 416 to either block or allow air flow through each suction cup 420A–420G depending on the media size selected. For the widest media to be held by suction cups 420A–420G and hence the applicator 162, which substantially covers the mounting surface 157 of the cylindrical drum 156 in the axial direction 210, all the servos 416 would be open allowing air to be drawn through each suction cup. Thus, only the suction cups 420A–420G which will contact the surface of the media are selected to have air drawn through.

Figure 5A:
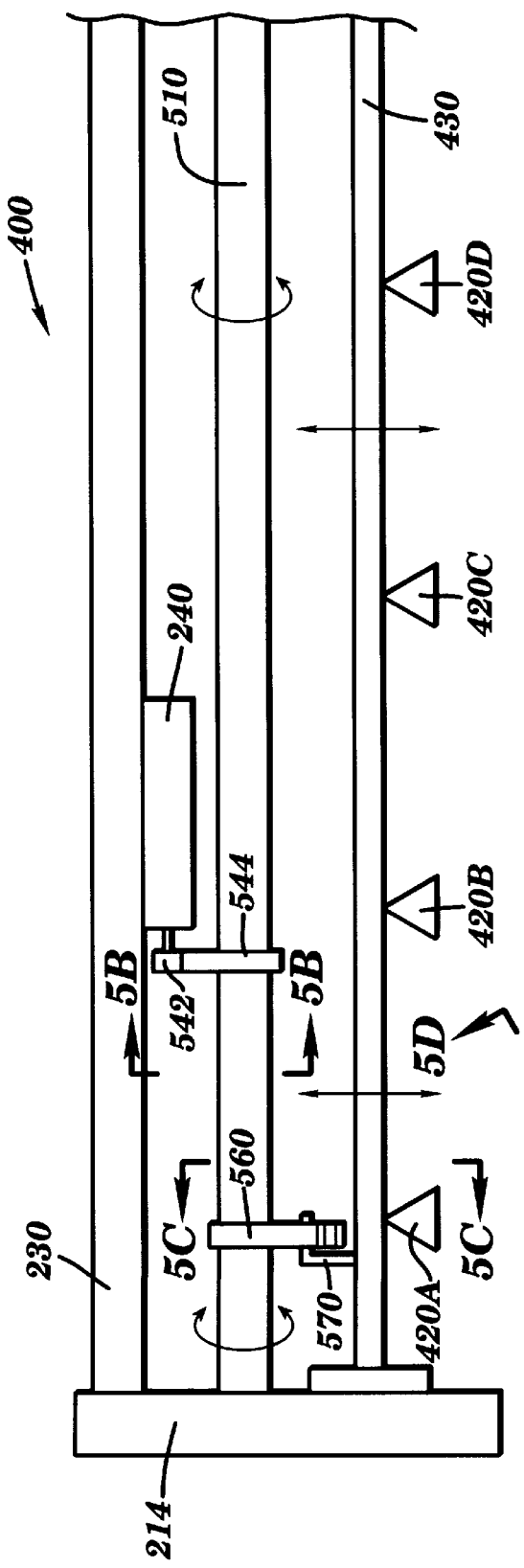
FIG. 5A details the cup module shown in FIG. 4, in accordance with the present invention.
Figure 5C:
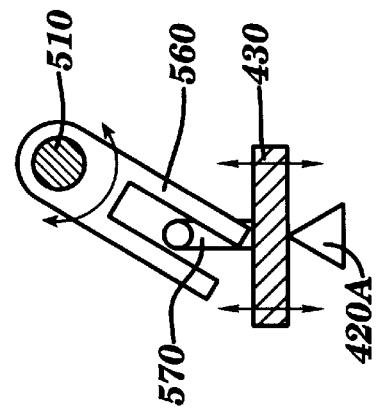
FIGS. 5B and 5C further detail the cup module shown in FIG. 5A, in accordance with the present invention.
Figure 5B:
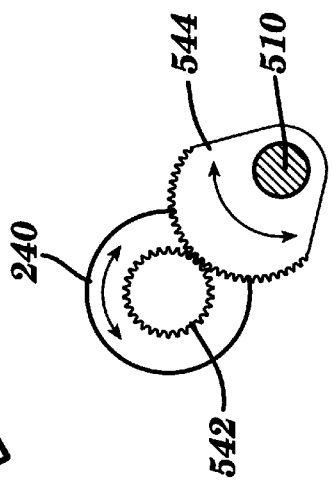

FIG. 5A illustrates the cup module's 400 drive system. A drive motor 240, fixedly mounted to the applicator carriage 230 and interfacing with engine controller 150, turns drive gear 542 which is engaged with a cam-shaped idler gear 544, as particularly featured in FIG. 5B. Idler gear 544 is fixedly mounted to shaft 510 which is rotatably mounted to endplate 214 on each end thereof. In this manner, drive motor 240 causes shaft 510 to rotate. A U-shaped bracket 560, fixedly attached to shaft 510 and extending therefrom, cooperates with an L-shaped bracket 570 fixedly attached to platen 430, as particularly illustrated in FIG. 5C, to raise and lower the platen. Platen 430 is slidably mounted to endplates 214 at each end allowing movement in the radial direction 215 of the drum 156. In operation, as bracket 560 rotates, the L-shaped bracket slides in and out of bracket 560 causing platen 430, which supports suction cups 420A–420G, to move in the radial direction 215 of the drum 156. In the preferred embodiment of the present invention, shaft 510 and longitudinal shaft 328 of the self-propelling drive system 202 are co-axial, i.e., longitudinal shaft 328 is mounted within shaft 510, thereby saving space in the applicator 162.

Figure 5D:
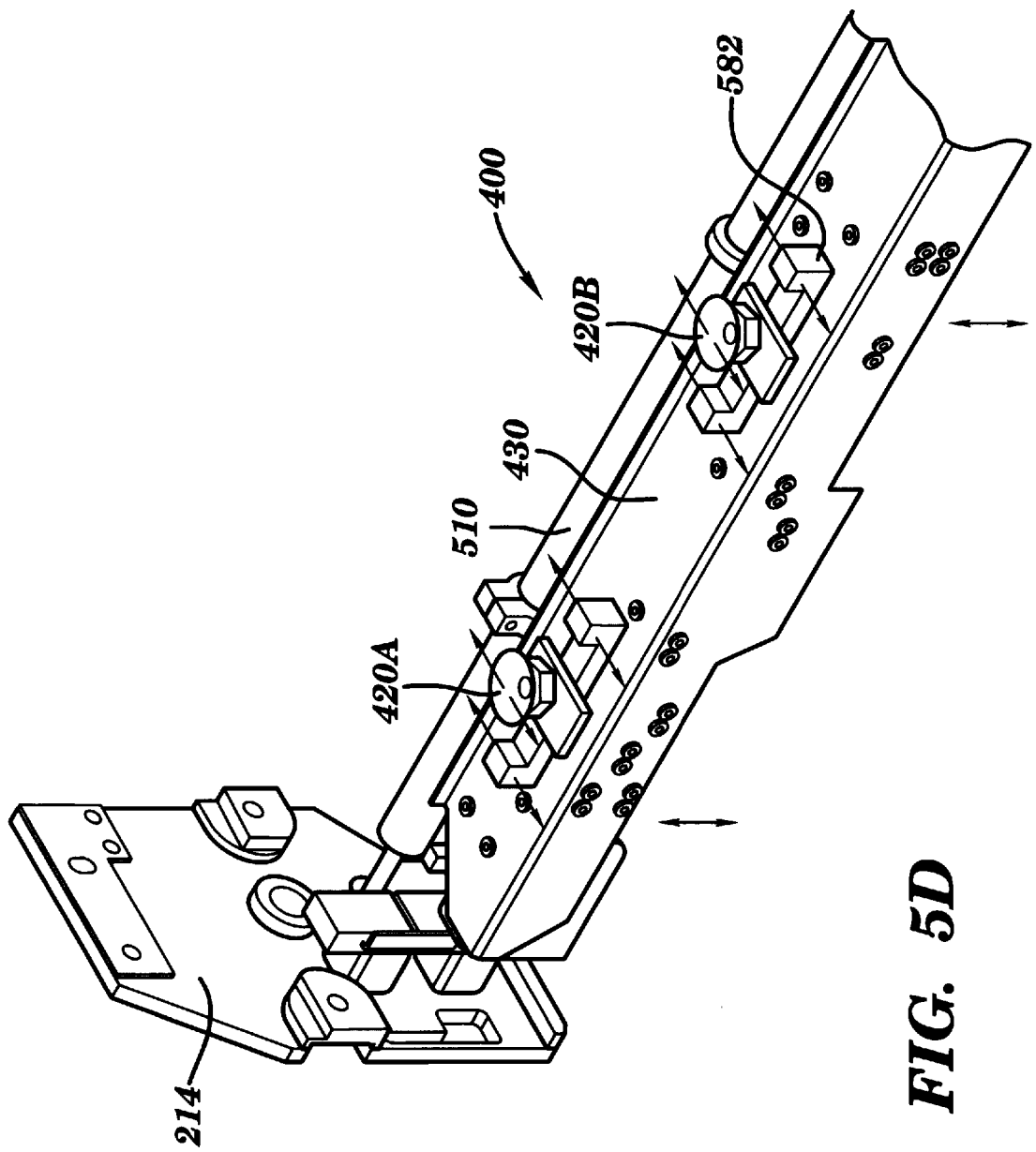
FIG. 5D depicts a partial isometric view of the cup module shown in FIG. 4, particularly featuring the finger members of the suction cups, in accordance with the present invention.

FIG. 5D further depicts the suction cup module 400. Because the suction cups (e.g., 420A–420G) will be contacting a plate to be loaded into the drum 156 directly, it is preferable that each suction cup be formed from a non-marking, pliant material such as urethane. It is also advantageous to include extensions or finger members 582 on each suction cup, the finger members being positioned along the longitudinal axis of the applicator 162. Finger members 582 prevent the media from rippling as it is pressed against the mounting surface 157 of the drum 156 during the loading operation, as will be further discussed below. Additionally, less suction cups 420A–420G are needed if finger members 582 are present because they spread out the applied force of the suction cups to the media during the loading operation, which reduces the likelihood of rippling the media.

FIG. 5E shows an exploded isometric view of an exemplary suction cup assembly 580, e.g., suction cup 420A. Generally, each suction cup is slidably mounted on platen 430 so as to be movable in the circumferential direction 212 of the drum 156. This allows a sheet of media held by the cups to be deskewed or squared on the mounting surface 157 of the drum 156, as will be discussed in detail below. More particularly, suction cup 420A connects to fitting 419 which is connected to hose 418. A block 588 and a plate having extending portions forming finger members 582 are disposed in-between the fitting 419 and suction cup 420A. Block 588 includes grooves 589 for slidably receiving a U-shaped bracket 583 which is fixedly attached to platen 430. Springs 586 are attached to block 588 on one end and to platen 430 on the other end thereby resiliently biasing suction cup 420A in the circumferential direction 212. It is preferable to bias all the suction cups 420A–420G towards the edge of the drum 156 where the sheet of media held by the cups will be positioned during imaging as further detailed below.

FIGS. 6A–6C detail the roller module 600. A drive motor 250, fixedly mounted to the applicator carriage 230, rotates drive gear 610 which is engaged with idler gear 620. Idler gear 620 is fixedly attached to shaft 630 which is rotatably mounted to endplate 214 on each end thereof. In this manner, drive motor 250 causes shaft 630 to rotate. A U-shaped bracket 632, fixedly attached to shaft 630 and extending therefrom, cooperates with a pin 634 fixedly attached to a platen 650, as particularly illustrated in FIG. 6B. A support member or platen 650 is slidably mounted to the applicator carriage 230 by means of slide assemblies 640. As particularly featured in FIG. 6C, slide assemblies 640 include a U-shaped angled bracket 641 which is fixedly attached to the applicator carriage 230. Grooves 644 in the wall of bracket 641 allow a block 642, which is fixedly mounted to platen 650, to slide in grooves 640. Thus, platen 650 may move in the radial direction 215 of the drum 156. Platen 650 supports individually spring-loaded rollers 660A–660D which press or iron down the media onto the mounting surface 157 as will be described below.

Figure 7A:
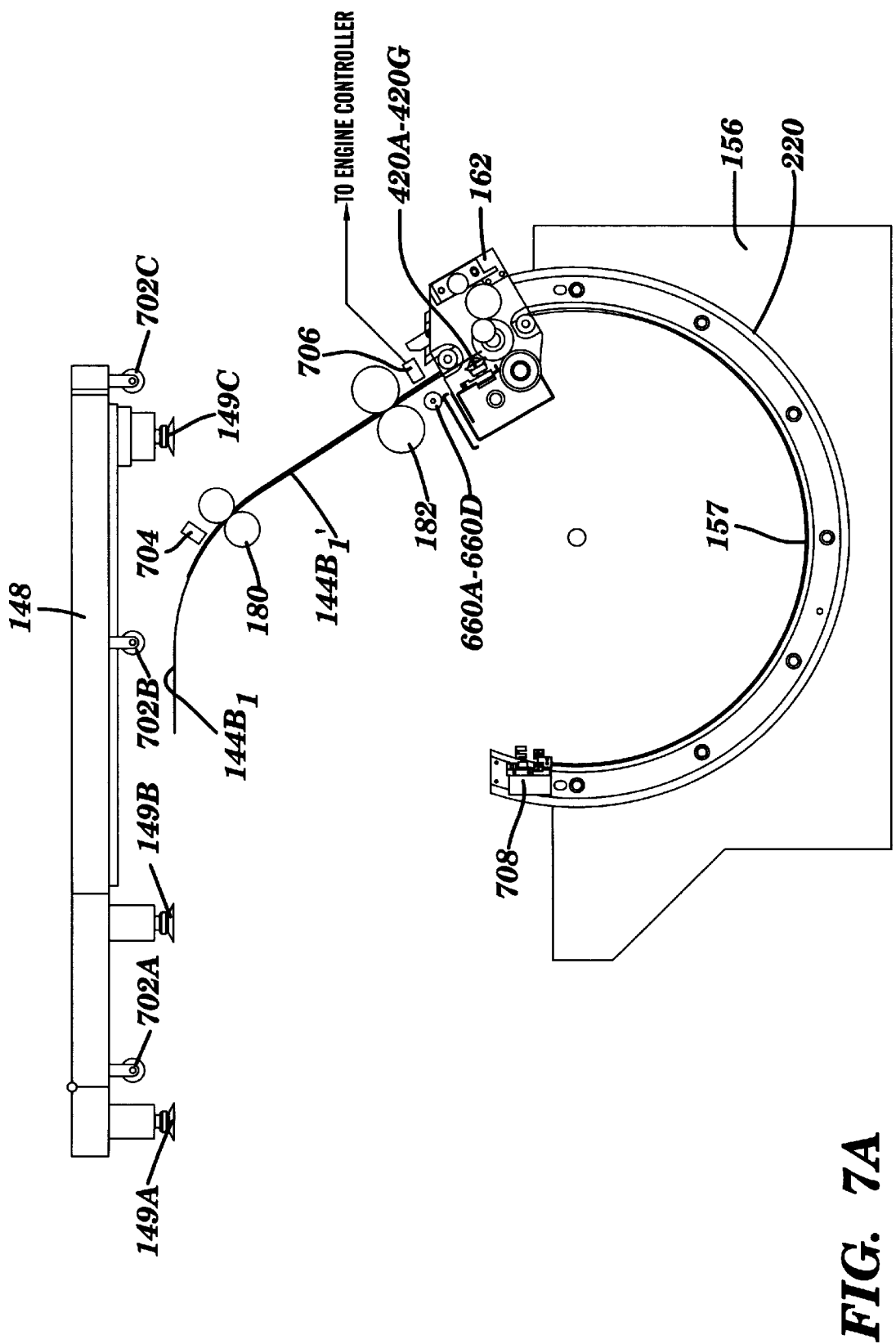
FIG. 7A depicts the delivery of a sheet of media in the FIG. 1 system, in accordance with the present invention.

FIG. 7A depicts the initial delivery of a single sheet of media 144B1, e.g., an aluminum or polyester plate, by the plate picker 148 to the applicator 162. FIG. 7A also provides further detail of the plate picker 148. As shown, the plate picker 148 includes suction cups 149A–149C. The vacuum created by the operation of the suction cups 149A–149C is distributed onto a major portion of the top surface of the plate 144B1 to lift the plate from the plate handler cassette 145B and to hold the plate as it is moved from the plate handler 142 to the applicator 162. As shown, rollers or wheels 702A–702C are provided for moving the plate picker 148 between the plate handler 142 and the far side of the cylindrical drum 156. The rollers 702A–702C ride along tracks or rails (not shown) which guide its movement between the plate handler 142 and drum 156.

As noted above, the plate picker 148 lifts and conveys the plate 144B1 by contacting only the top side of the plate. Because the plates are stored in each cassette 145A–145D emulsion side down, the emulsion side of the plate 144B1' is not contacted by the suction sups 149A–149C of the plate picker 148. As shown, the plate picker 148 moves the plate 144B1 over the mounting surface 157 of the cylindrical drum 156 at a distance above the cylindrical drum 156. As will be described further below, this facilitates the buffering of a plate proximate to the applicator 162 when the applicator is moved to the upper right side of the cylindrical drum 156, i.e., its parked or home position. As will be described in more detail below, this permits the plate picker 148 to return to the plate handler 142 to retrieve another plate while there is a plate being imaged in the imager 152 and a plate in the buffering position.

As the plate picker 148 moves towards the applicator 162, the vacuum created by suction cups 149A–149C is extinguished so that the leading edge of the plate 144B1 separates from the suction cups. A guide block 704 guides the leading edge of the plate 144B1 to a pair of drive rollers which form nip 180. Nip 180 rotates to drive and guide the leading edge of the plate 144B1 between a pair of drive wheels forming nip 182, which is controlled by the engine controller 150. An input sensing device 706 which preferably includes a light emitting diode (LED) for directing light, of a wavelength which does not expose the plate, onto the plate 144B1 and a light detector, for example a photodiode, for sensing light reflected by the plate 144B1, detects the passage of the leading edge of the plate 144B1. More particularly, when the leading edge of the plate reflects the light emitted by the LED, the detector senses the reflected light causing it to generate an electrical signal to the engine controller 150, thereby informing the engine controller of the disposition of the plate 144B1. As shown in FIG. 7A, the engine controller 150 controls the nip 182 to drive the leading edge of the plate 144B1 to a predetermined position beyond the sensing device 706 so as to be accessible by the applicator 162. The rollers 660A–660D on the applicator 162 may be used to guide the plate so the leading edge of the media 144B1 does not interfere with suction cups 420A–420G as the plate is positioned beyond the sensing device 706.

The suction cups 420A–420G are initially fully retracted in the home position, i.e., the suction cups are extended radially inward, as shown in FIG. 7A. When the leading edge of the media 144B1 is finally positioned by nips 180 and 182, the engine controller 152 causes suction cups 420A–420G to begin drawing air by controlling servos 416 as described above, the number of suction cups activated corresponds to the width of the plate 144B1 in the axial direction 210 of the drum 156. The engine 150 controller also simultaneously causes drive motor 240 to extend suction cups 420A–420G radially outward to attach the suction cups of the applicator to the emulsion side of the plate. In the preferred embodiment of the present invention, the suction cups 420A–420G are positioned approximately ½" from the leading edge of the plate 144B1. Once the suction cups 420A–420G have taken hold of the plate, the engine controller 150 then directs drive motor 240 to move suction cups 420A–420G thereby lifting the plate 144B1 away from the mounting surface 157 so as to be positioned to move the plate clockwise in the drum 156. In the preferred embodiment, the leading edge 144B1' is lifted approximately one inch (measured radially) off the mounting surface 157 which allows sufficient clearance during the loading operation described below.

Figure 7B:
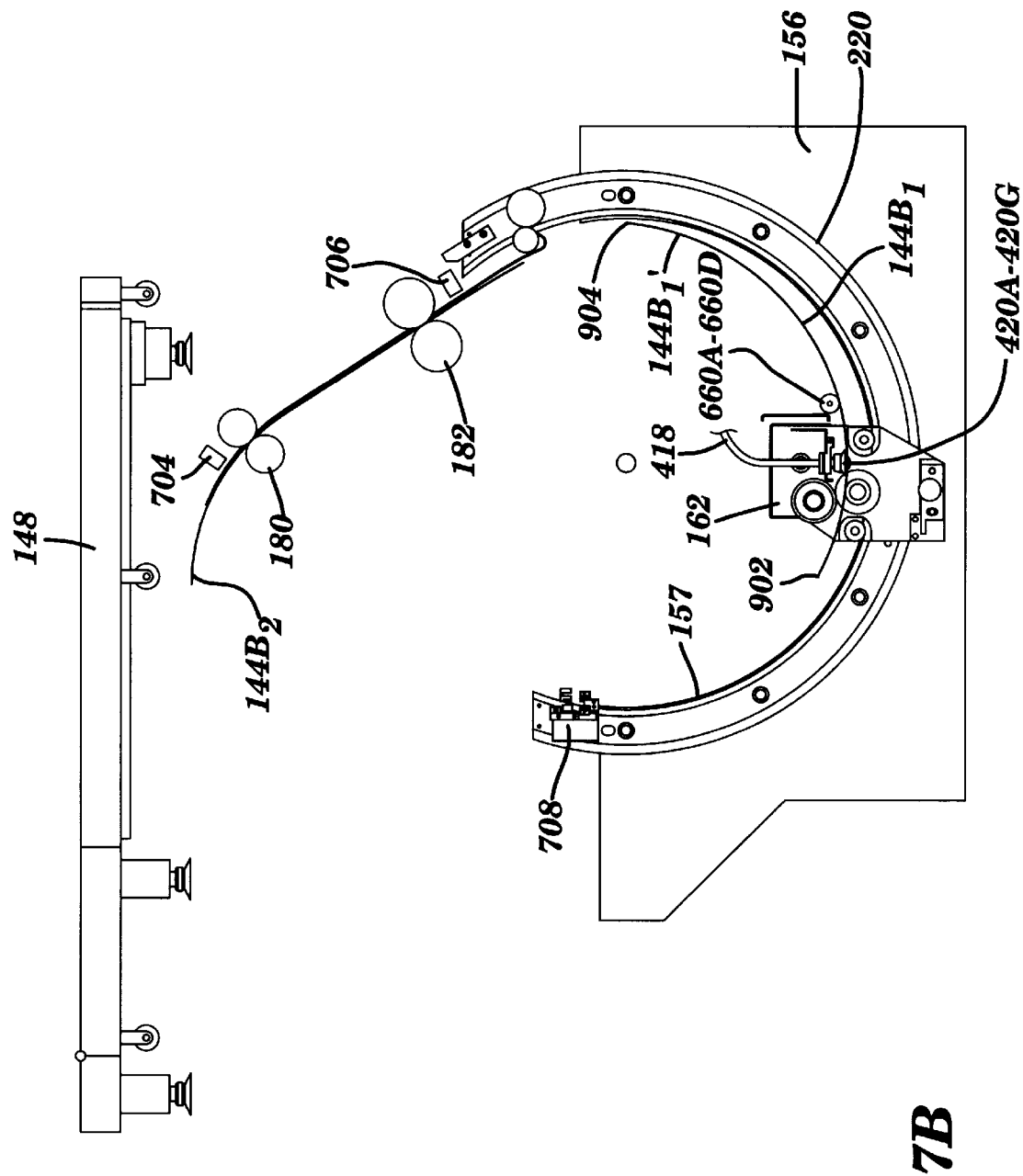
FIG. 7B depicts the loading of the sheet of media shown in FIG. 7A in the cylindrical drum, in accordance with the present invention.

FIG. 7B depicts the plate 144B1 being loaded by the applicator 162, leading edge 902 and trailing edge 904 last, onto the mounting surface 157 of the cylindrical drum 156 emulsion side 144B1' facing radially inward. Another plate 144B2 has been moved, during the loading of plate 144B1, by the plate picker 148 and nips 180 and 182 to be held over the mounting surface 157 while plate 144B1 is imaged, i.e., held in a 'buffer' position. The leading edge of plate 144B2 is disposed at the previously described distance past input sensing device 706. The plate 144B2 is, as shown, entirely released from the plate picker 148 during buffering. Accordingly, the plate picker 148 may be directed by engine controller 150 to return to a position over the cassette 145B to begin delivery of yet another plate to the applicator 162 after the release of the plate 144B2.

Figure 7C:
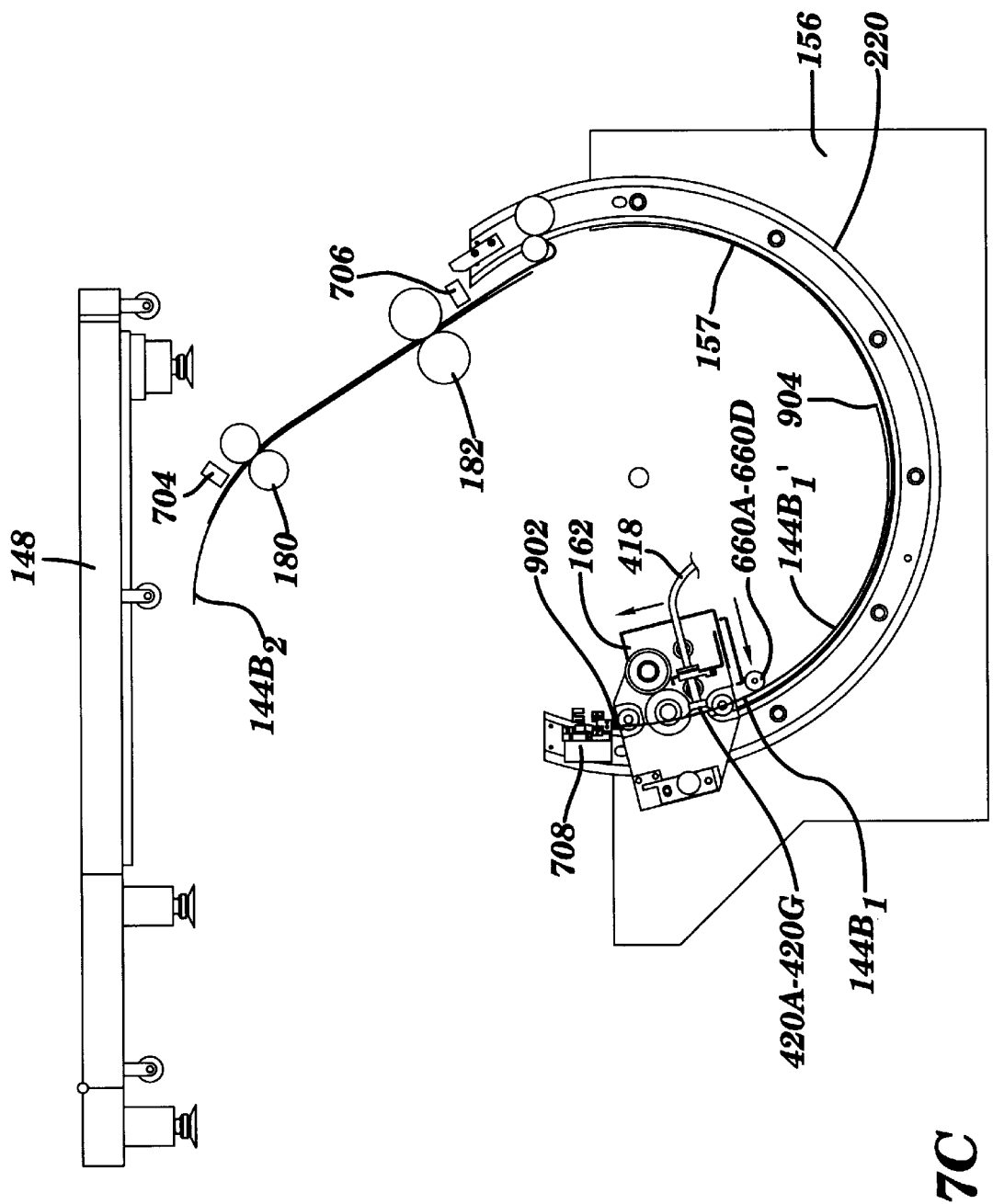
FIG. 7C depicts the registration of the sheet of media shown in FIG. 7B and the buffering of another sheet of media, in accordance with the present invention.

In FIG. 7C, the applicator 162 has loaded the plate 144B1 onto the mounting surface 157 of the cylindrical drum 156 and is approaching register assembly 708 but has yet to complete the final positioning of the plate. As indicated, the emulsion side 144B1' of plate 144B1 is positioned facing radially inward within the cylindrical drum 156. The engine controller 150 directs drive motor 240 to extend suction cups 420A–420G radially outward to lower the leading edge 902 of plate 144B1 towards mounting surface 157 as the plate approaches a register assembly 708. In the preferred embodiment of the present invention, ironing rollers 660A–660D may be extended radially outward to bend the plate 144B1 so that it conforms with the curvature of the mounting surface 157 of the cylindrical drum 156. This allows the leading edge 902 of plate 144B1 to be lifted slightly away from mounting surface 157 so that the leading edge first contacts the register assembly 708. This operation is preferred because the plate 144B1 may be rigid and thus not conform to the curvature of the drum 156, making it difficult to properly register and position the plate 144B1 to the mounting surface 157.

A register assembly 708 is preferably of the type described in U.S. patent application Ser. No. 08/868,720, filed on Jun. 4, 1997, (Attorney Docket #3175-017), the disclosure of which is incorporated herein by reference, is located at the upper left side of the cylindrical drum 156 and is used to finally positioned the leading edge 902 of plate 144B1 as it is loaded by applicator 162 onto the mounting surface 157. In the preferred embodiment of the present invention, there are two register pin and bar assemblies 708 slidably mounted along the axial direction 210 of the drum 156, such that media of differing widths can be properly registered as will be described below. A drive device (not shown) connected to engine controller 150 and positioned on each register pin and bar assembly 708, drives each assembly along the axial direction 210 according to a signal generated by the engine controller which corresponds to the width of the media in the axial direction 210.

Figure 7D:
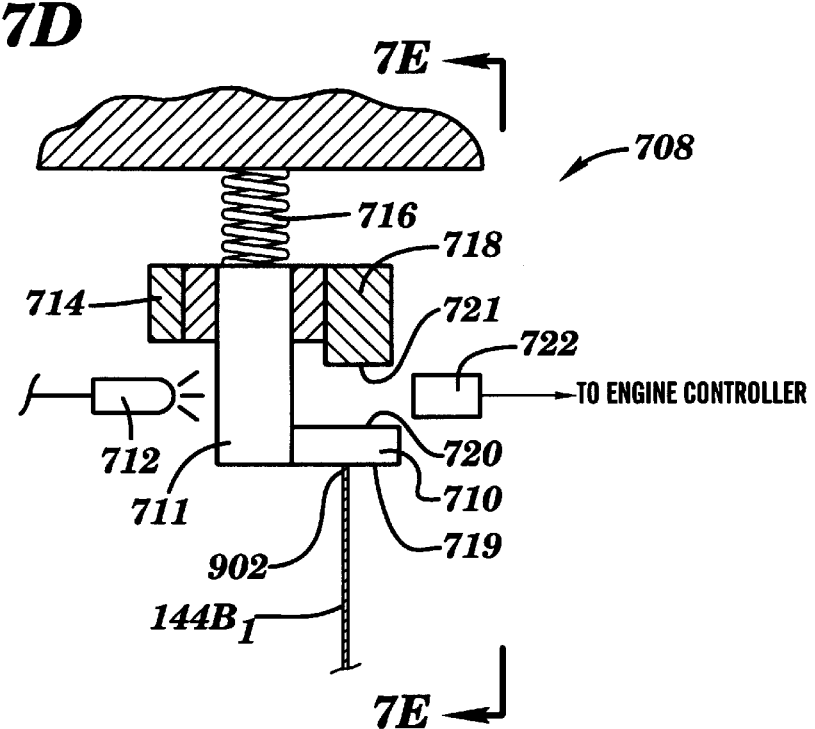
FIG. 7D details the register assembly shown in FIGS. 7A–7C, in accordance with the present invention.
Figure 7E:
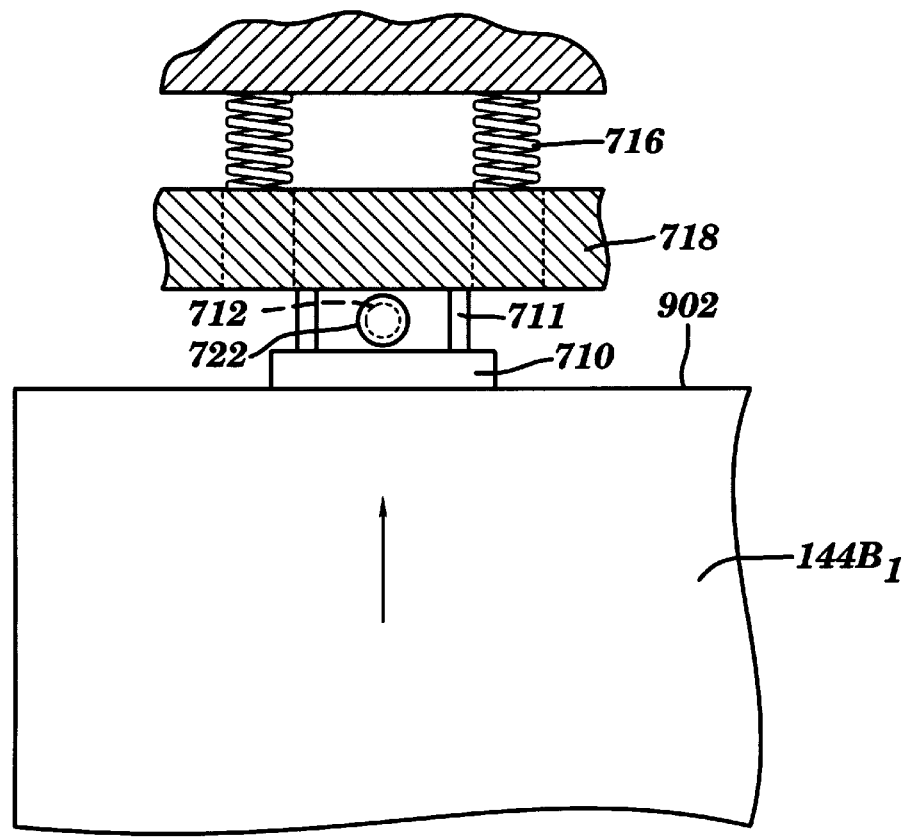
FIG. 7E is another view of the register assembly shown in FIG. 7D, in accordance with the present invention.

FIGS. 7D and 7E depict the register assembly 708 used to ensure proper alignment of the plate 144B1 on the mounting surface 157. A registration pin 719 includes a registration pin member 710 and slide member 711. The slide members 711 are mounted to springs 716 which are designed to allow movement of the pin member 711 towards and away from a contact surface 721 of a registration bar 718. Registration bar 718 is positioned at the upper left side of the cylindrical drum 156 and extends along the axial direction 210 of the drum 156. The slide members 711 pass through an elongated aperture formed along substantially the full length of registration bar 718 and are supported by bushings 714 disposed therein.

A light emitting diode (LED) 712 is provided to emit a radiating light beam which passes between the registration pin member 710 and the registration bar 718 when not in contact. The light detected by the photodiode 722 which generates a signal to the engine controller 150 indicative of no contact between the registration pin 719 and registration bar 718. This allows engine controller 150, and accordingly the system operator, to determine if plate 144B1 is properly positioned on mounting surface 157 of the cylindrical drum 156 prior to imaging. Alternatively, a registration device could be provided which includes an electric detection circuit which is closed when a metallic media contacts the device. However, such circuits can only confirm whether or not the media is properly positioned when the media is metallic and are useless when a non-metallic media is being positioned on the mounting surface 157.

As shown in FIG. 7E, the LED 712 and photodiode 722 are disposed between the slide pins 711. As plate 144B1 moves in the direction of the arrow 760, the leading edge 902 of plate 144B1 makes contact with pin member 710 and pushes the pin 719 such that the slide members 711 force the springs 716 to be compressed and the contact surface 720 of the registration pin 710 to move toward the contact surface 721 of the registration bar 718. When the contact surfaces 720 and 721 make contact, the light from the LED 712 is totally blocked such that the photodiode 722 ceased to detect the radiating light. The photodiode 722 therefore stops generating a signal to the engine controller 150 thereby indicating to the engine controller, and hence to the system operator, that media 144B1 is in proper registration at the applicable registration pin 719.

FIG. 7F shows the movement of plate 144B1 after contact between the first registration pin 719 positioned proximate to the right side of the plate 144B1 with the registration bar 718, while a second registration pin 719 proximate to the left side of plate 144B1 has yet to contact the registration bar 718, with the plate 144B1 being moved in the direction indicated by arrow 760. Accordingly, plate 144B1 is improperly positioned on the mounting surface 157 at this point.

As indicated previously, suction cups 420A–420G are attached proximate the leading edge 902 of plate 144B1. Suction cups 420A–420G are spring biased towards the registration bar 718. Because the engine controller 150 is aware that the left registration pin 719 has yet to contact the registration bar 718, engine controller directs drive motor 240 of the applicator 162 to move plate 144B1 toward the registration bar 718. The plate 144B1, although restricted from further movement toward the registration bar 718 on the right side of the plate 144B1, is able to slightly rotate about the right side registration pin 719. Suction cups 420A–420G move relative to the applicator 162 allowing this slight rotation. This allows the left side of plate 144B1 to continue to move, pushing the left side registration pin 719 up against the registration bar 718 and thereby eliminate the skew as indicated. The final position of the suction cups is indicated by dashed circles 420A'–420F' and final position of the deskewed plate is indicated by 906.

Figure 7G:
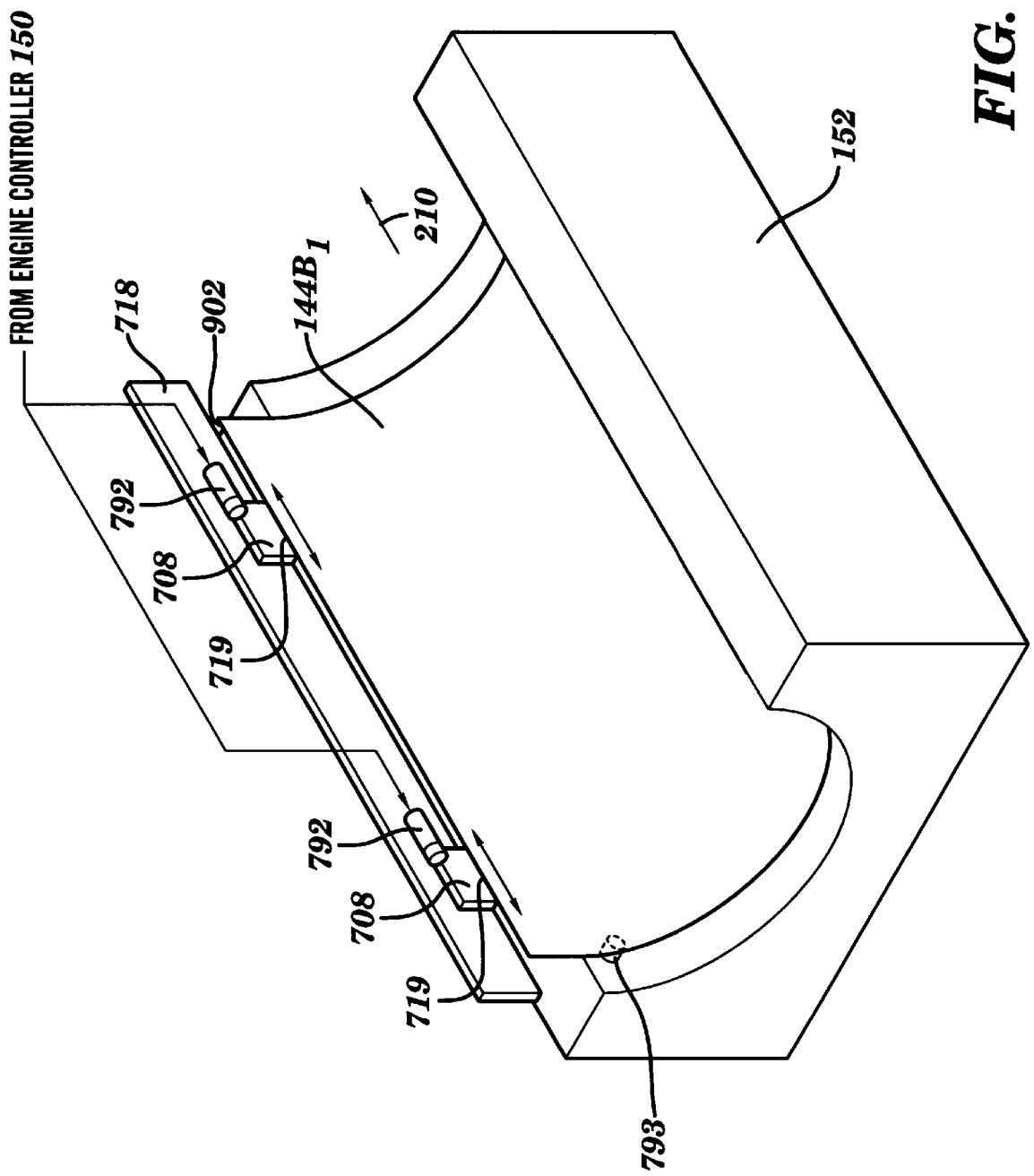
FIG. 7G depicts the registration assembly positioned in the drum including a left edge registration pin, in accordance with the present invention.
Figure 7H:
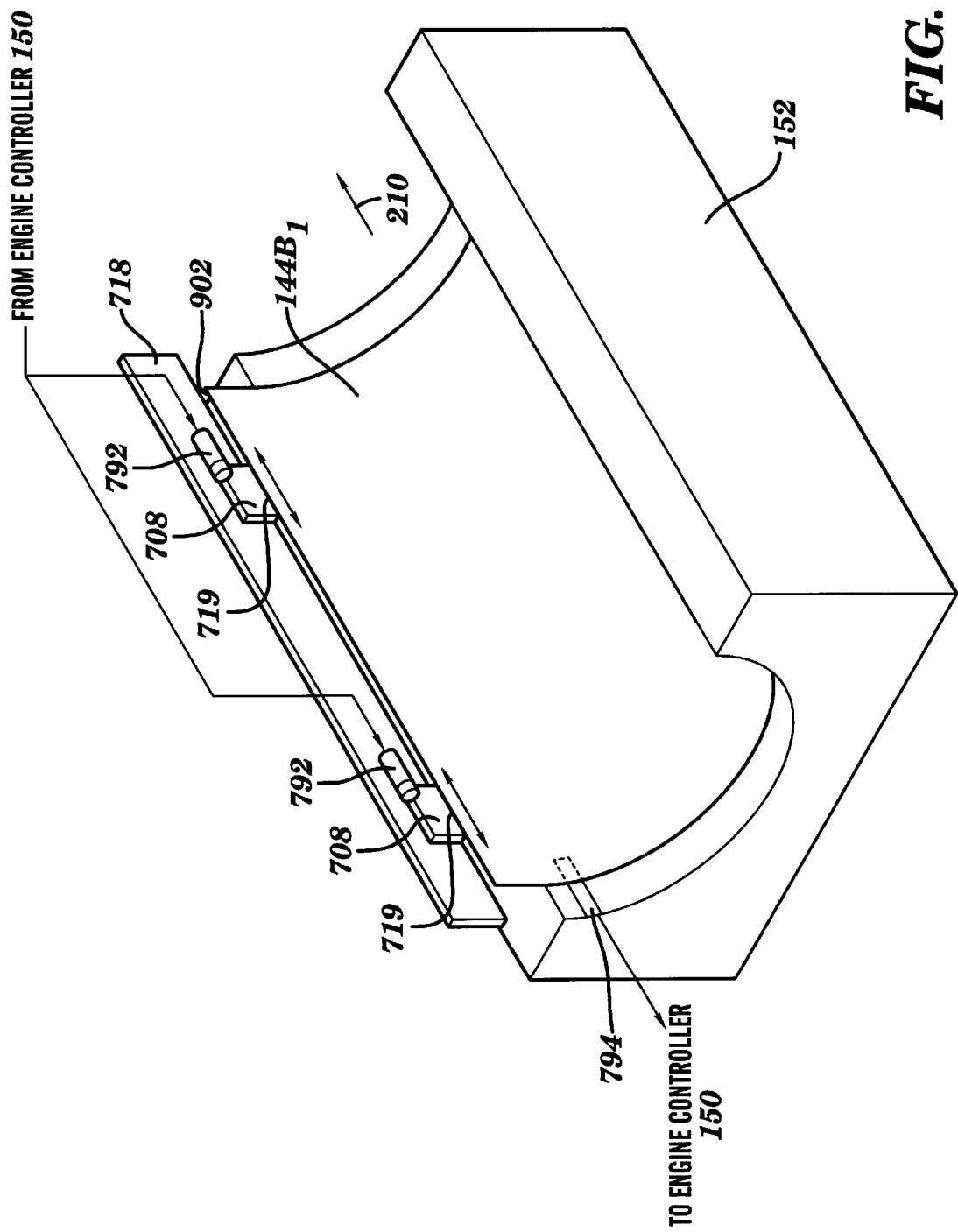
FIG. 7H is similar to FIG. 7G, but with an edge detector substituted for the left edge registration pin.

In the preferred embodiment of the present invention, the plate 144B1 is left justified using an edge detector assembly 794, as shown in FIG. 7H. Alternatively, as shown in FIG. 7G, a registration pin 793 may be used to guide the edge of the plate as the leading edge 902 contacts the registration pins 719 so that the plate is consistently left edge justified on the drum 152. As shown in FIG. 7H, the left edge detector 794 is a large area light detector which is recessed in the drum 152. The detector 794 detects light from a scanning light beam used to image the media. A signal representing the location of the edge of the plate is provided by scanning the detector 794 until the scanning beam reaches the edge of the plate. The signal is transmitted to the engine controller 150 which, on the basis of the identified location of the side edge of the plate, begins recording an image a predefined distance from the edge of the plate. It is important to position the image on the plate with respect to the register assembly 708 and the left edge and to use these same registration points in post-imaging operations, for example, to register the plate in a punching or notching device as will be described in more detail below.

At this point, as discussed above, the engine controller 150 is made aware when both registration pins 719 are registered to the registration bar 718 and, accordingly, that plate 144B1 is ready for final positioning on the mounting surface 157 of the cylindrical drum 156. The engine controller 150 directs drive motor 240 to extend suction cups 420A–420G radially outward so the suction cups and finger members 582 push plate 144B1 against the mounting surface 157. The finger members 582 ensure the plate 144B1 uniformly contacts the mounting surface 157, as described above.

Figure 7I:
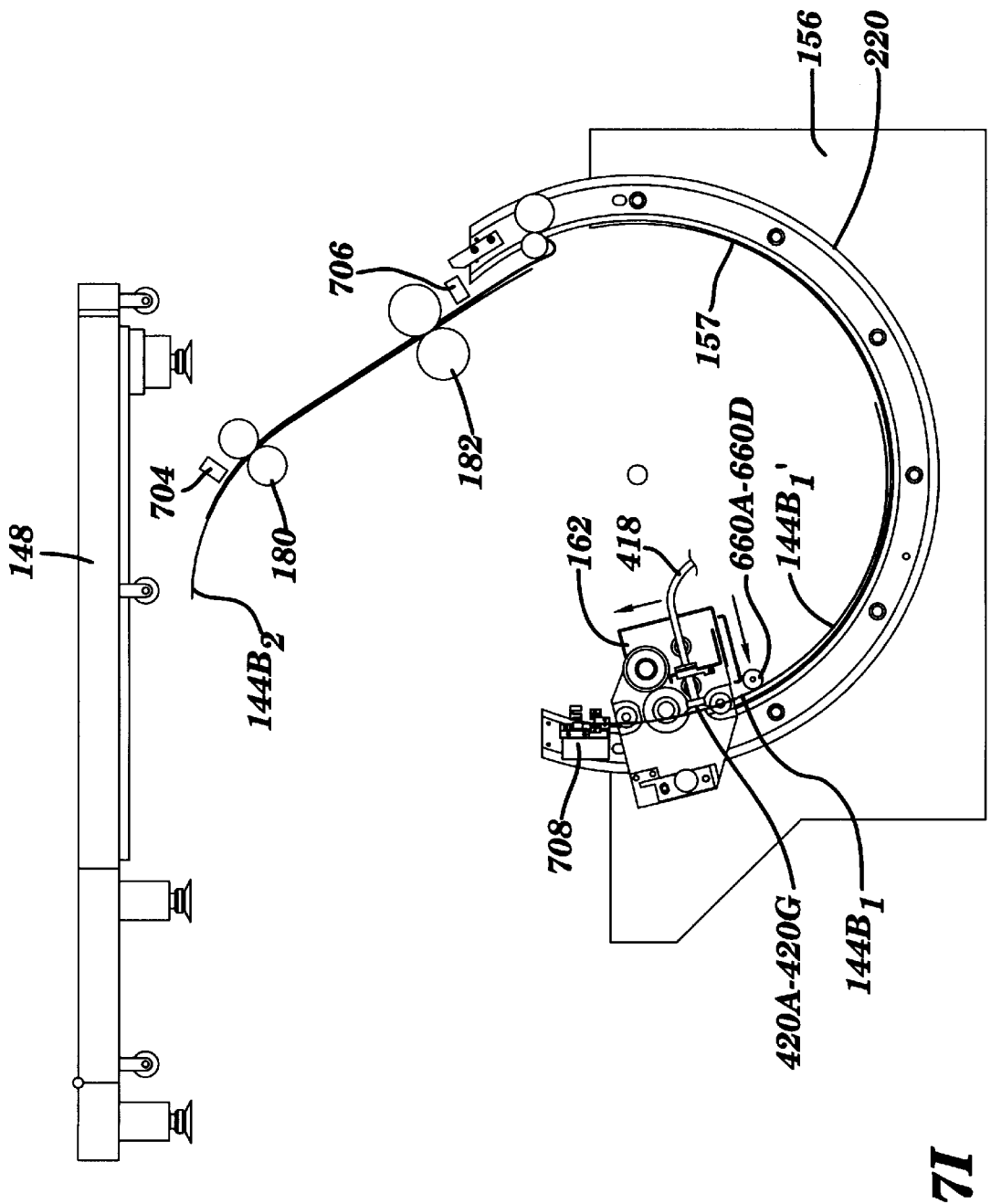
FIG. 7I depicts the final positioning of the first sheet of media in the cylindrical drum of the FIG. 1 system, in accordance with the present invention.
Figure 7J:
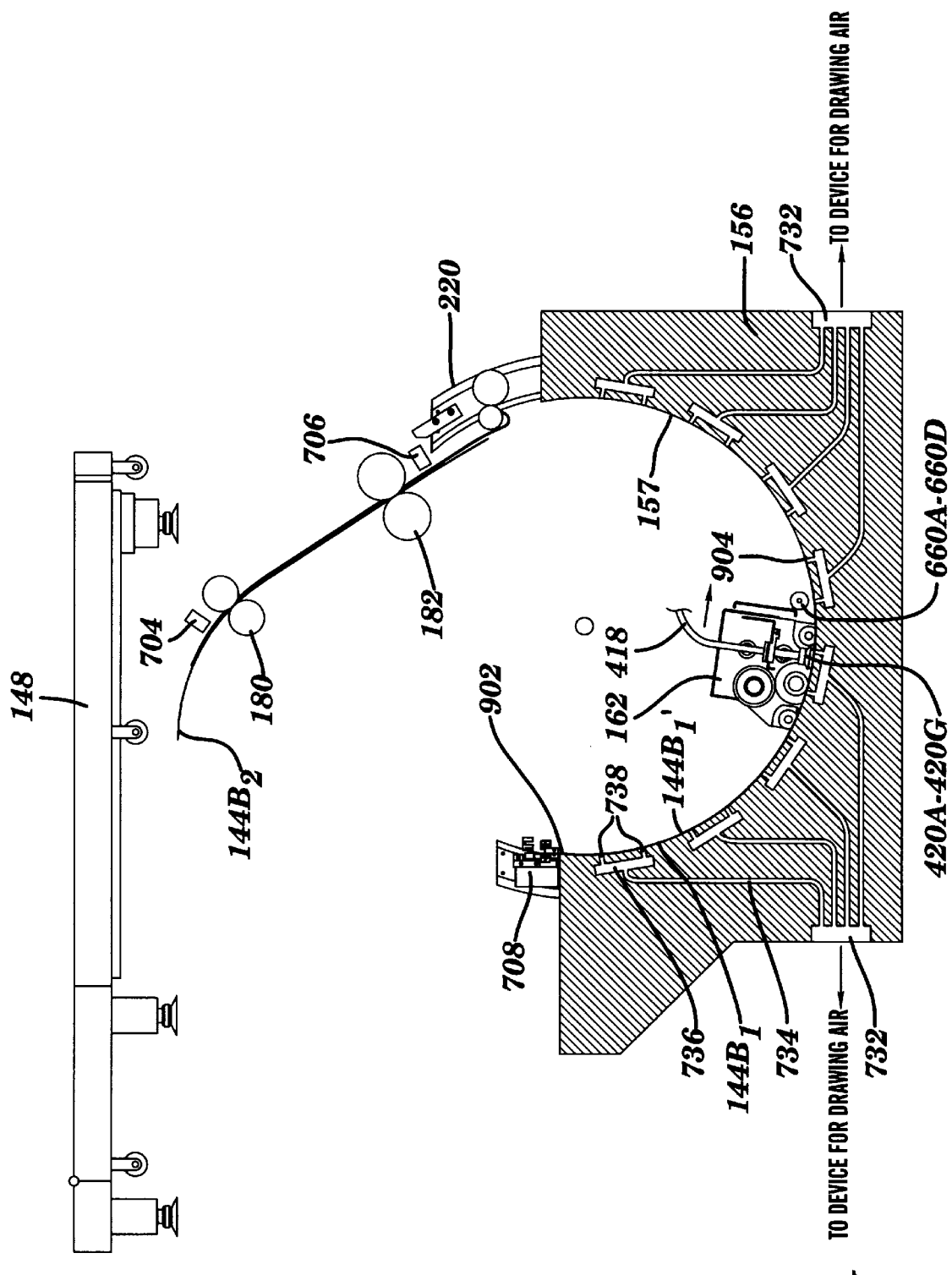
FIG. 7J depicts the securing of the first sheet of media to the mounting surface of the cylindrical drum of the FIG. 1 system, in accordance with the present invention.

FIG. 7I depicts the final positioning of the plate 144B1 against the register assembly 708. The drum 156 contains a vacuum system for holding plates to the mounting surface 157, preferably as described in U.S. patent application Ser. Nos. 08/867,128 and 08/868,526, both filed on Jun. 4, 1997, the disclosure of which are incorporated by reference. Briefly, as shown in FIG. 7J, the drum is provided with a device for drawing air (not shown) connected to sequencing manifolding devices 732 which communicate with vacuum channels 736 disposed with the drum 156. Vacuum channels 736 communicate with chambers 736 disposed underneath the mounting surface 157 parallel to the registration bar 718. A plurality of vacuum ports 738 pass from the mounting surface 157 and communicate with chambers 736. The device for drawing air and manifolds 732 are controlled by the engine controller 150 so that air drawn by the device for drawing air can be controlled by manifolds 732 to draw air only through those vacuum ports 738 in the mounting surface 157 covered by plate 144B1. The device for drawing air is provided with more than one setting for increasing or decreasing the volume of air being drawn depending on the type of media to be held to the mounting surface 157. For example, polyester media is more pliable than an aluminum media so the device for drawing air is made to be controllable to reduce the volume of air being drawn so the media is not drawn into grooves patterns (not shown) disposed within the mounting surface which communicate with the vacuum ports 738.

In the preferred embodiment of the present invention, after plate 144B1 is properly positioned on the mounting surface 157, the engine controller 150 directs vacuum to be drawn from a first row of chambers 738 disposed directly below the leading edge 902 thereby holding the leading edge 902 of plate 144B1. Vacuum to suction cups 420A–420G of the applicator 162 is extinguished and the suction cups are directed by engine controller 150 to travel radially inward so they are not contacting plate 144B1. The engine controller 150 simultaneously directs drive motor 250 to extend ironing rollers 660A–660D radially outward such that the rollers press plate 144B1 to the mounting surface 157. The engine controller 150 then directs drive motor 200 to move applicator in a counter-clockwise fashion such that ironing rollers 660A–660D press or iron plate 144B1 to the mounting surface 157. As ironing rollers 660A–660D pass over each row of chambers 736, the engine controller 150 controls manifolds 732 such that air is drawn through each row of chambers 738 the rollers pass over as well as any row of chambers the rollers have already passed over. Alternatively, the vacuum system could be controlled by the engine controller 150 so that a volume of air is first drawn over the entire region of the mounting surface 157 the plate 144B1 will cover and then the ironing rollers 660A–660D could begin ironing down plate 144B1.

After the applicator 162 has finished ironing down plate 144B1, it returns to the home position, as shown in FIG. 7A. The engine controller 150 then processes a signal to indicate that the positioning is complete and directs the scan assembly 154 to record an image onto the plate 144B1.

Figure 7K:
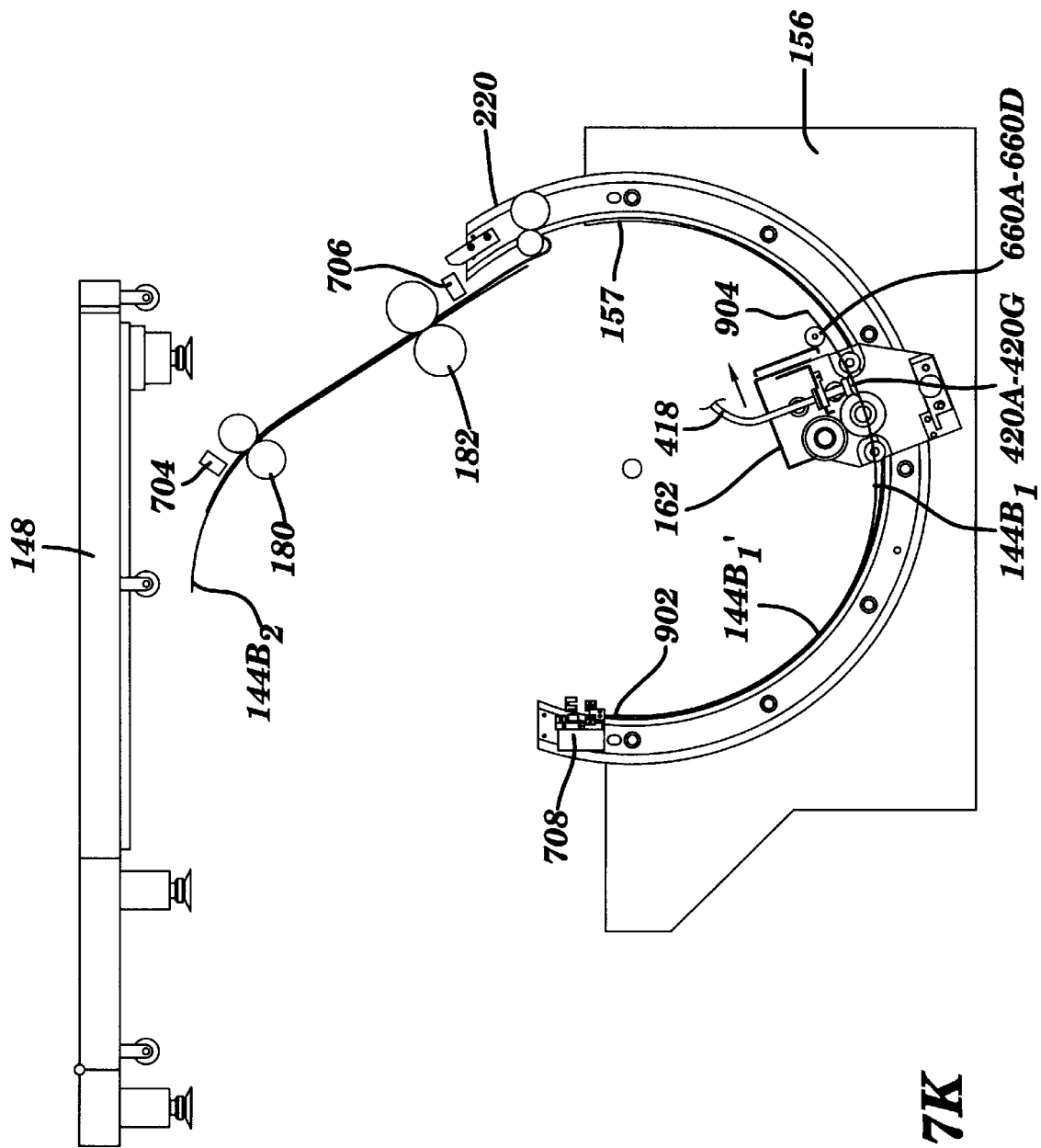
FIG. 7K depicts the initiation of removal of the imaged first sheet of media from the cylindrical drum of the FIG. 1 system, in accordance with the present invention.

Upon completion of the image recording process, the applicator 162 begins the removal of plate 144B1 from the mounting surface 157, as shown in FIG. 7K. It should be noted that edge 902, which was the leading edge of the plate 144B1 as it was being positioned on the mounting surface 157 as shown in FIG. 7B, is the trailing edge of the plate 144B1 as it is removed by the applicator 162 from the mounting surface 157. Similarly, edge 904, which was the trailing edge of the plate 144B1 as it was being loaded onto the mounting surface 157, is now the leading edge of plate 144B1 as it is removed from the mounting surface of the drum 156. The engine controller 150 directs drive motor 200 to position the applicator 162 such that suction cups 420A–420G are positioned near edge 904, which in the preferred embodiment, is between 2½"–3" from edge 904. Vacuum is drawn through suction cups 420A–420G as they extend radially outward to attach to plate 144B1. Simultaneously, or just prior to drawing air through suction cups 420A–420G, the vacuum system which holds plate 144B1 to the mounting surface is extinguished so the plate may be lifted off the mounting surface 157. Suction cups 420A–420G, now attached to plate 144B1, retract and the applicator 162 travels counter-clockwise on track 220 towards the home position. It is preferable to allow the vacuum system which holds the plate 144B1 to the mounting surface 157 sufficient time to extinguish (i.e., 'bleed off') the vacuum so that plate 144B1 can be lifted off as soon as cups 420A–420G contact plate 144B1.

Figure 7L:
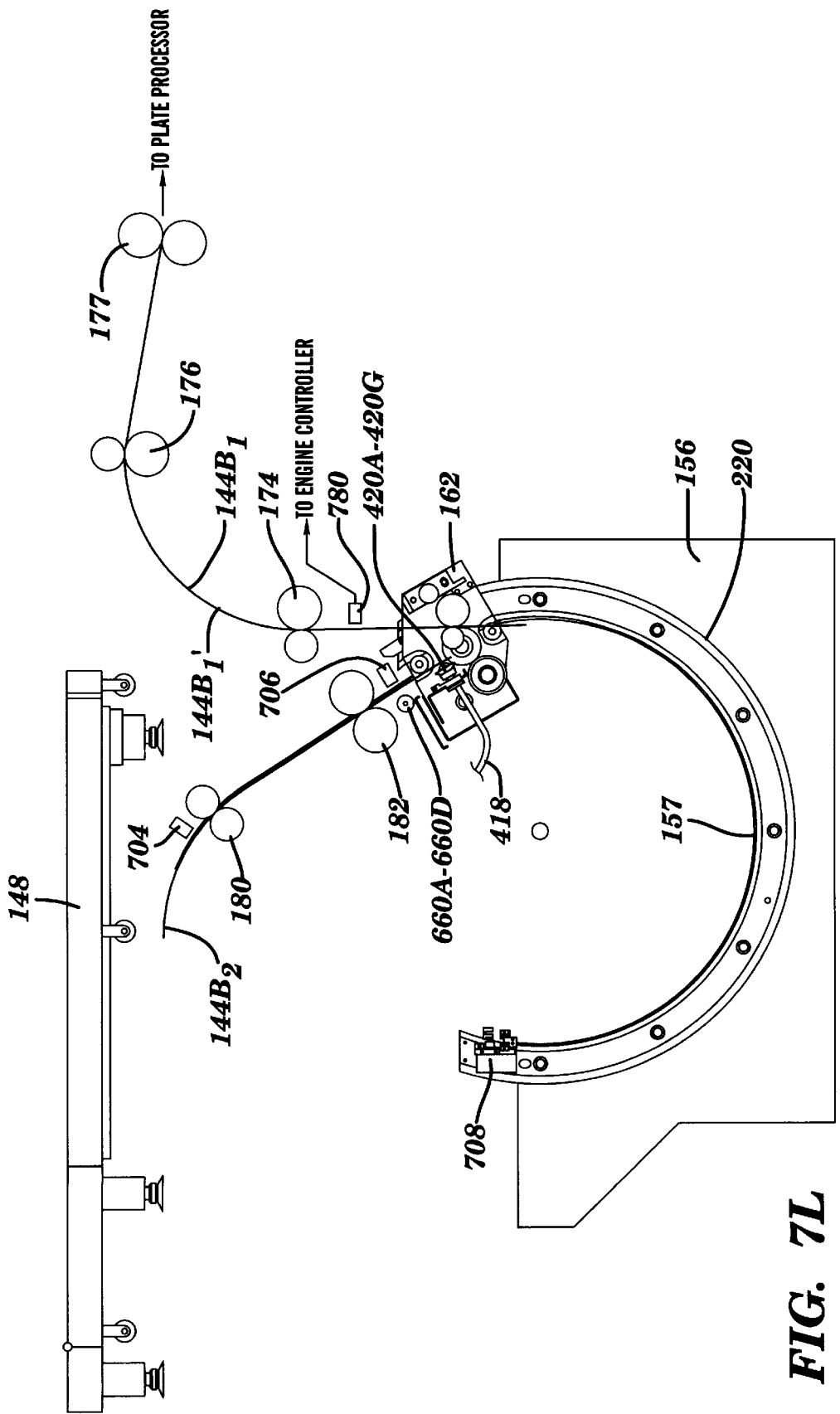
FIG. 7L depicts the buffering of the imaged first sheet of media removed from the cylindrical drum of the FIG. 1 system, in accordance with the present invention.

An output sensing device 780, shown in FIG. 7L, which preferably includes a light emitting diode (LED) for directing light onto the imaged plate 144B1 and a light detector, for example a photodiode, for sensing light reflected by plate 144B1, detects the passage of the leading edge 902 of the plate. More particularly, when the leading edge 902 of the plate 144B1 reflects the light emitted by the LED, the detector senses the reflected light causing it to generate an electrical signal to the engine controller 150, thereby informing the engine controller of the disposition of the plate 144B1. The engine controller 150 then directs the applicator 162 to move a predetermined distance counter-clockwise on track 220 such that the leading edge 902 is delivered and secured within a pair of drive rollers forming nip 174. Vacuum is extinguished in suction cups 420A–420G and the suction cups are retracted such that they move radially inward. Nip 174, controlled by the engine controller 150, drive the plate 144B1 to nip 176, and hence to a buffered position prior to entering a plate processor 172. The plate 144B1 is buffered until the plate processor 172 is ready to process the plate, at which time nips 174,176, and 177 drive the plate into the plate processor 172 for processing.

Figure 7M:
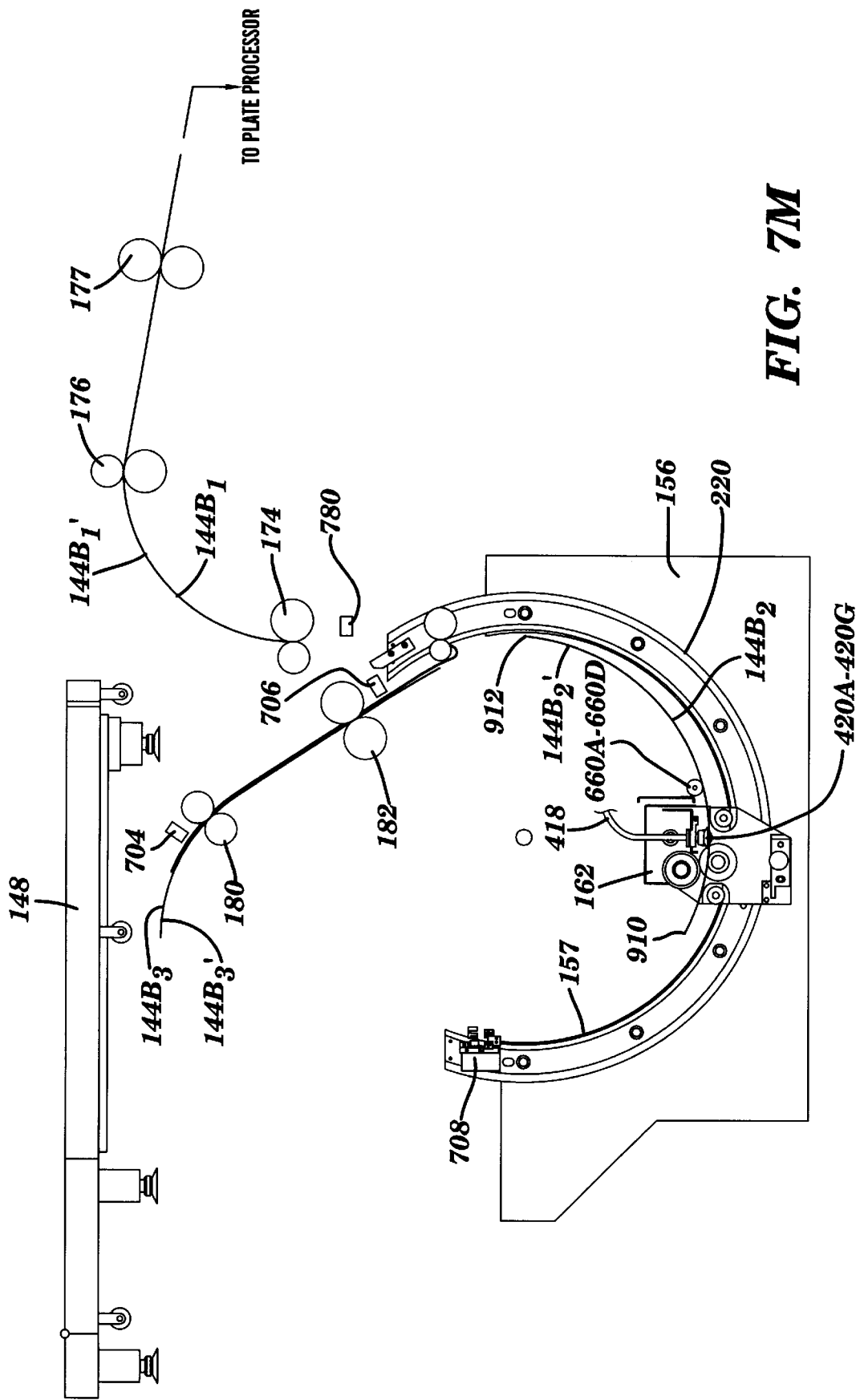
FIG. 7M depicts the buffering of two sheets of media as a third sheet of media is positioned in the cylindrical drum of the FIG. 1 system, in accordance with the present invention.

FIG. 7M depicts plate 144B1 in a buffered position awaiting loading in the plate processor 172. Simultaneously, the plate 144B2 is positioned on the mounting surface 157 of the cylindrical drum 156 by the applicator 162, leading edge 910 first and trailing edge last 912. At the same time, a third plate 144B3, which has an emulsion side 144B3', is buffered above the mounting surface 157 of the cylindrical drum 156. The plate picker 148 may be directed by the engine controller 150 to return to a position over the cassette 145B to begin delivery of yet another plate to the applicator 162 after the release of plate 144B3. Accordingly, the imaging system 100 has two plates buffered and one plate being positioned in the cylindrical drum 156 for imaging.

Figure 8:
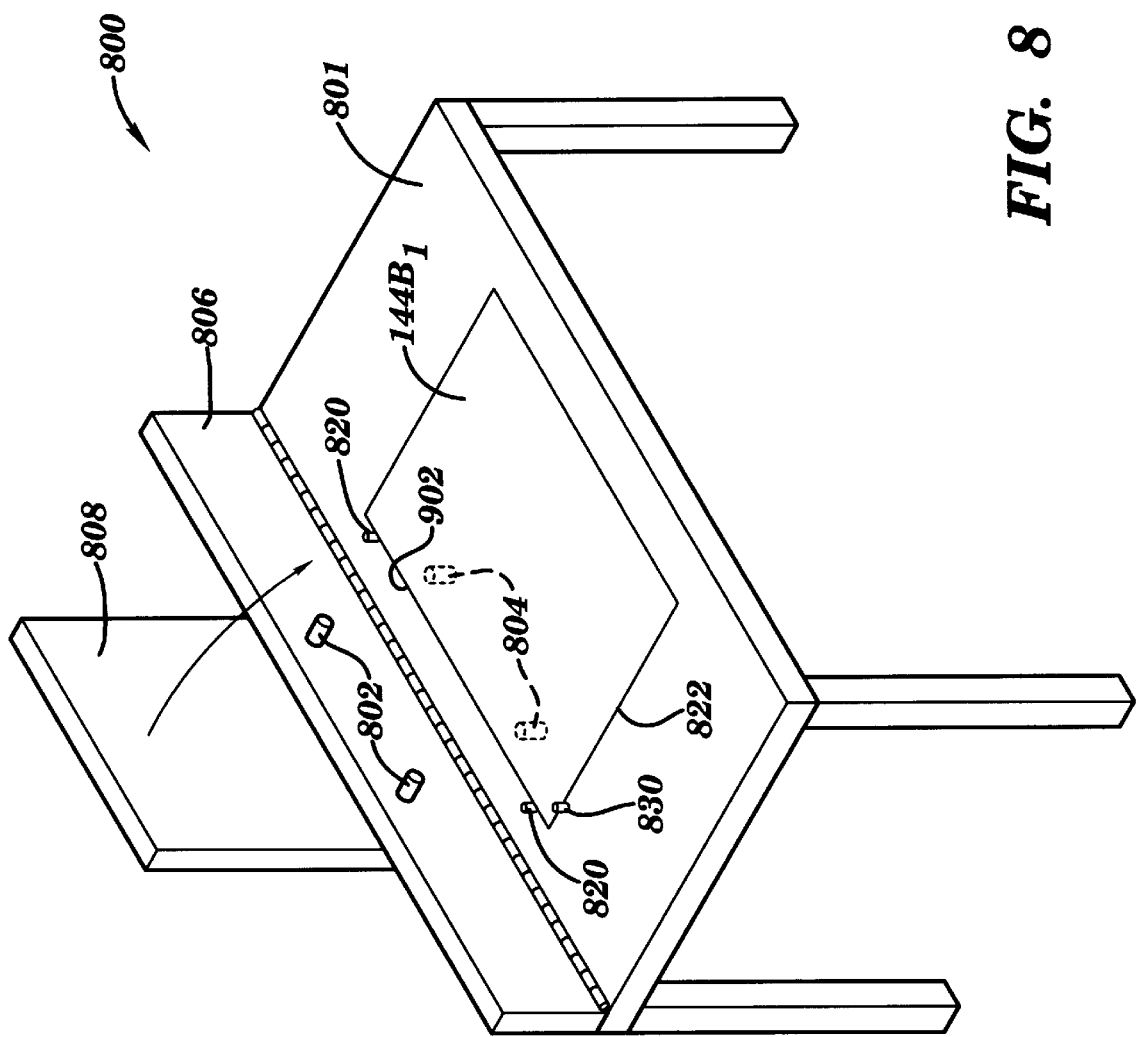
FIG. 8 depicts a punching/notching device, in accordance with the present invention.

After being processed by the plate processor 172, plate 144B1 may be removed and placed on a punching/notching device, referred to as reference number 800 in FIG. 8. The punching/notching device 800 comprises a support surface 801 which may hold moveable registration pins 820 and justification pin 830. Recessed within the support surface 801 are dies 804 for receiving punches 802, which are affixed to pivotal member 806. Registration pins 820 are positioned at a predetermined distance apart according to the plate size with larger plates having larger pin separations to provide more accurate alignment of the plate leading edge 144B1 with punches 802. In operation, the operator sets the pins 820 according to the plate size and then places plate 144B1 on the support surface 801 and registers the leading edge 902 to registration pins 820 and justification edge 822 to justification pin 830. A handle 808 is provided on the pivotal member 806 for rotating the pivotal member such that punches 802 pass through the plate 144B1 and engage dies 804. It is important to configure the moveable registration pins 719 and justification pin 793 in the imaging engine 152 as closely as possible to the configuration on the punching/notching device 800 so the plate 144B1 is being registered by the same points on the leading 902 and justification edge 822 of the plate. The configurations should be the same because the image is positioned on the printing plate 144B1 at a known distance and orientation relative to the leading 902 and justification edge 822 of the plate. Therefore, in order to ensure the plate 144B1 and hence the image is positioned at a known distance and orientation relative to a reference surface in a printing press (not shown), it is preferable to use the same registration points on the leading 144B1 and justification edge 822 to eliminate errors due to local imperfections or defects in the plate edge. This is especially important in color printing applications, for example, where four or more color separations of the image must be consistently registered to the printing press. The present invention thus reduces registration errors in color printing with an automated platemaking system.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and the present invention can be beneficially utilized in any number of environments and implementations. Accordingly, the claims set forth below should be construed in view of the full breadth and spirit of the invention as disclosed herein.

What is claimed is:

1. An imaging system, comprising:
   a sheet of media to be imaged at an imaging position, said sheet of media including a leading edge;
   a support surface for supporting said sheet of media at said imaging position during imaging;
   a registration device including a registration axis for establishing said imaging position and wherein said registration device is configured to be contacted by said leading edge at at least two points for indicating when said sheet of media is at said imaging position;
   a loading device for advancing said sheet of media across said support surface with said leading edge substantially perpendicular to a direction of movement of said advancing sheet of media until said leading edge is registered against said registration device at said at least two points; and
   an imaging device configured to expose an image onto said sheet of media, said image being positioned at a predetermined distance and orientation relative to said registration axis.

2. The imaging system according to claim 1, wherein:
   said loading device lifts said leading edge above said support surface while advancing said leading edge across said support surface and lowers said leading edge towards said support surface as said leading edge approaches said registration device.

3. The imaging system according to claim 1, wherein said imaging device is configured to scan said sheet of media with an exposing beam to linewise expose said image onto said sheet of media.

4. The imaging system according to claim 1, wherein said loading device includes a plurality of attaching devices for attaching to said sheet of media proximate to said leading edge.

5. The imaging system according to claim 1, wherein said registration device generates a signal until said sheet of media is at said imaging position, said loading device advancing said sheet of media until said signal ceases to be generated by said registration device.

6. The imaging system according to claim 1, wherein said support surface is an internal surface of a cylindrical drum and said loading device advances said sheet of media across said internal surface of said cylindrical drum.

7. The imaging system according to claim 6, further comprising:
   a first and a second track fixed on a first and a second end of said cylindrical drum for guiding the movement of said loading device; and
   a drive device mounted on said loading device and drivingly engaging at least one of said first or said second track for driving said loading device along said first and said second track.

8. The imaging system according to claim 1, wherein said registration device further comprises a registration bar having a reference surface for defining said registration axis, said reference surface being positioned with respect to said support surface and said image to be recorded and being configured to be contacted by said registration device for indicating when said leading edge is registered against said registration device at at least two points.

9. The imaging system according to claim 8, wherein said loading device aligns said leading edge substantially parallel with said registration axis.

10. The imaging system according to claim 8, wherein said loading device includes a plurality of attaching devices for attaching said sheet of media proximate to said leading edge and wherein said attaching devices are configured to be movable with respect to the loading device for aligning said leading edge with respect to said registration device.

11. The imaging system according to claim 10, wherein said plurality of attaching devices are resiliently biased towards said direction of movement of said sheet of media.

12. The imaging system according to claim 8, wherein said registration device further comprises a first and a second moveable registration element configured to be contacted and moved by said leading edge and constrained by said reference surface.

13. The imaging system according to claim 12, wherein said registration device generates a signal until said sheet of media is at said imaging position, said signal being generated until said first and said second moveable registration elements are constrained by said reference surface, said loading device advancing said sheet of media until said signal ceases to be generated by said registration device.

14. The imaging system according to claim 12, wherein said first and said second moveable registration elements comprise a first and a second registration pin configured to be contacted and moved by said leading edge and constrained by said reference surface.

15. The imaging system according to claim 14, wherein said registration device generates a signal until said sheet of media is at said imaging position, said signal being generated until said first and said second moveable registration pins are constrained by said reference surface, said loading device advancing said sheet of media until said signal ceases to be generated by said registration device.

16. The imaging system according to claim 12, wherein at least one of said first and said second moveable registration elements is moveable along an axis parallel to said registration axis for changing the separation between said first and said second moveable registration elements in accordance with the size of said sheet of media.

17. The imaging system according to claim 12, wherein said loading device includes a plurality of attaching devices for attaching said sheet of media proximate to said leading edge, said attaching devices being configured to be movable with respect to the loading device such that when one of said first or said second registration elements is contacting said reference surface, said loading device continues to move said leading edge against said first and said second registration elements until both of said first and said second registration elements are in contact with said reference surface.

18. The imaging system according to claim 17, wherein said loading device pushes said plurality of attaching devices against said support surface when said first and said second registration elements are contacting said reference surface thereby forcing said sheet of media against said mounting surface.

19. The imaging system according to claim 18, further comprising opposing finger members extending from each of said plurality of attaching devices and movable therewith for pushing, against said support surface together with said plurality of attaching devices thereby assisting in forcing said sheet of media against said mounting surface.

20. The imaging system according to claim 1, wherein said registration device further comprises a first registration element configured for defining a first point on said registration axis, and a second registration element configured for defining a second point on said registration axis, said first and said second points being configured to be contacted by said leading edge when said sheet of media is at said imaging position.

21. The imaging system according to claim 20, wherein at least one of said first and said second registration elements is moveable along an axis parallel to said registration axis for changing the separation between said first and second registration elements in accordance with the width of said leading edge.

22. The imaging system according to claim 4, wherein said plurality of attaching devices communicate with a sequencing device for drawing air through a predetermined number of said plurality of attaching devices, said predetermined number corresponding to the width of said sheet of media such that only said plurality of attaching devices contacting said sheet of media are activated.

23. The imaging system according to claim 1, wherein said loading device further comprises an ironing roller for rolling against said sheet of media after said loading device has positioned said sheet of media at said imaging position thereby providing contact between said sheet of media and said support surface.

24. The imaging system according to claim 23, further comprising a holding mechanism for holding said sheet of media onto said support surface, comprising:
 a plurality of vacuum ports passing through and disposed in a predefined pattern over said support surface;
 a device for drawing air through each of said plurality of vacuum ports to hold said sheet of media against said support surface; and
 a sequencing manifold connected between said device for drawing air and said plurality of vacuum ports for selectively drawing air through a portion of said plurality of vacuum ports in accordance with the size of said sheet of media.

25. The imaging system according to claim 24, wherein said plurality of vacuum ports are disposed in a plurality of rows, each row being substantially parallel with said registration axis, and further comprising a controller for controlling said sequencing manifold such that air is cumulatively and sequentially drawn through each row of said plurality of rows of said vacuum ports as said roller device passes over each of said plurality of rows.

26. The imaging system according to claim 1, wherein said sheet of media further includes a media justification edge substantially perpendicular to said leading edge and wherein said imaging position is further defined by a image position justification edge substantially perpendicular to said reference axis, said imaging system further comprising:
 (a) another registration device configured to be contacted by said media justification edge for indicating when said sheet of media is at said imaging position; and
 (b) wherein said imaging device is configured to expose said image onto said sheet of media at a predetermined distance from said image position justification edge.

27. The imaging system according to claim 26, wherein said another registration device is a justification pin to be contacted by said media justification edge.

28. The imaging system according to claim 1, wherein said sheet of media includes a media justification edge substantially perpendicular to said leading edge and wherein said imaging position is further defined by a image position justification edge substantially perpendicular to said reference axis, said imaging system further comprising:
 (a) a device for determining a position of said media justification edge; and
 (b) wherein said imaging device is configured to expose said image onto said sheet of media at a predetermined distance relative to said position of said media justification edge.

29. A method of imaging, comprising:
 (a) advancing a sheet of media with a loading device across a support surface to an imaging position, a leading edge of said sheet of media advancing substantially perpendicular to a direction of movement of said sheet of media;
 (b) driving said leading edge against a registration device having a registration axis until said sheet of media is in contact with said registration device at at least two points; and
 (c) exposing an image onto said sheet of media with an imaging device configured to expose an image onto said sheet of media, said image being positioned at a predetermined distance and orientation relative to said registration axis.

30. The method of imaging according to claim 29, further including the steps of:
 (a) lifting said leading edge away from said support surface while advancing said leading edge across said support surface; and
 (b) lowering said leading edge towards said support surface prior to driving said leading edge against said registration device.

31. The method of imaging according to claim 29, wherein said exposing step is performed by linewise exposing said image onto said sheet of media.

32. The method of imaging according to claim 29, wherein the step of driving said leading edge against said registration device orients said leading edge substantially parallel with said registration axis.

33. The method of imaging according to claim 29, wherein said registration device includes a first registration point and a second registration point for defining said registration axis, further comprising the steps of:
 (a) selecting a sheet of media according to the size of the image to be recorded prior to advancing said sheet of media; and
 (b) moving at least one of said first and said second registration points along an axis parallel to said registration axis thereby changing the separation between said first and second registration points in accordance with the size of said sheet of media.

34. The method of imaging according to claim 29, further comprising the step of forcing said leading edge against said support surface after said loading device has positioned said sheet of media at said imaging position thereby providing contact between said sheet of media and said support surface.

35. The method according to claim 29, wherein said loading device further comprises an ironing roller and said support surface includes a plurality of vacuum ports passing through said support surface and disposed in rows parallel to said registration axis, a device for drawing air through each of said plurality of vacuum ports to hold said sheet of media against said support surface, and a sequencing manifold connected between said device for drawing air and said plurality of vacuum ports for selectively drawing air through a portion of said plurality of vacuum ports, further comprising the steps of:
 (a) drawing air through a row of said plurality of rows of said vacuum ports adjacent said leading edge after said leading edge has been pressed to said support surface;
 (b) rolling said sheet of media with said ironing roller thereby providing contact between said sheet of media and said support surface; and
 (c) controlling said sequencing manifold to cumulatively and sequentially draw air through each row of said plurality of vacuum ports as said roller devices passes over each of said plurality of rows.

36. The method of imaging according to claim 29, wherein said sheet of media includes a justification edge substantially perpendicular to said leading edge, further comprising the step of registering said justification edge to another registration device.

37. The method of imaging according to claim 36, further comprising the step of exposing said image onto said sheet of media at a predetermined distance from said another registration device.

38. The method of imaging according to claim 29, wherein said sheet of media includes a justification edge substantially perpendicular to said leading edge, further comprising the steps:
   (a) determining a position of said justification edge; and
   (b) exposing said image onto said sheet of media at a predetermined distance from said position of said justification edge.

39. A method for making a printing plate on an imaging system including a registration axis formed by a first registration point and a second registration point for registering a leading edge of a plate to be recorded, comprising the steps of:
   (a) selecting a plate size in accordance with the size of an image to be recorded;
   (b) moving at least one of said first and said second registration points such that said first and said second registration points are separated by a predetermined distance according to said plate size;
   (c) advancing said leading edge across a support surface to contact said first and said second registration points; and
   (d) recording a latent image onto said printing plate with said imaging device, said imaging device configured to expose said image onto said sheet of media at a predetermined distance and orientation relative to said registration axis.

40. The method for making a printing plate according to claim 39, further comprising the steps of:
   (a) processing said latent image in an image processor;
   (b) loading said printing plate into a device for punching or notching printing plates, said punching/notching device including a first and a second registration point separated by said predetermined distance;
   (c) registering said leading edge to said first and said second registration points of said punching/notching device; and
   (d) punching or notching said printing plate in preparation for mounting in a printing press.

41. The method for making a printing plate according to claim 39, wherein said printing plate further includes a justification edge substantially perpendicular to said leading edge, further comprising the steps of:
   (a) recording said latent image at a predetermined distance from said justification edge; and
   (b) registering said justification edge against a justification device included in said punching/notching device.

42. A method of recording images onto sheets of media of various widths supported on a support surface, each sheet of media having a first media reference edge of a known width, comprising the steps of:
   a. providing a registration device for contacting the first media reference edge at at least two points, said at least two points forming a registration axis at a known position and orientation with respect to the support surface and with respect to the images to be recorded onto the sheets of media, said registration device being capable of changing the separation between the two points;
   b. generating a signal by a controller, the signal corresponding to the width of the sheet of media to be recorded and communicating the signal to the registration device;
   c. changing the separation between the two points of the reference device in accordance with the signal to adjust width of the registration axis according to the media width; and,
   d. advancing the media across the reference surface in a manner which ensures that the first media reference edge contacts the registration device at the two points.

43. The method of claim 42 wherein each sheet of media includes a justification edge which is substantially perpendicular to the first media reference edge, further comprising the steps of:
   a. determining the position of the justification edge after the first media reference edge is in contact with the registration device at the at least two points; and,
   b. recording the image onto the sheet of media at a predetermined image location which is located a know distance from each of said first media reference edge and said justification edge and wherein an edge of said image is oriented substantially parallel with one of said first media reference edge and said justification edge.

44. The method of claim 43 further comprising the steps of:
   a. removing the sheet of media from the support surface after recording the image thereon;
   b. loading the sheet of media onto a punching and notching device for punching and notching the sheet of media at predetermined locations with respect to the image; and,
   c. aligning the sheet of media on the punching an notching device utilizing the first media reference edge and the media justification edge wherein, the punching and notching device provides two contact points for contacting said first media reference edge, said two contact points being substantially oriented in the same location as said at least two points forming a registration axis of said registration device.

* * * * *